US012723367B2

(12) United States Patent
Palmer et al.

(10) Patent No.: US 12,723,367 B2
(45) Date of Patent: Sep. 1, 2026

(54) EXTENDED SCOOPED TRENCHING BLADE

(71) Applicant: Evolution Drilling Tools, Inc., Quanah, TX (US)

(72) Inventors: Jason Palmer, Huntsville, UT (US); Ronnie Keys, Quanah, TX (US)

(73) Assignee: Evolution Drilling Tools, Inc., Quanah, TX (US)

(*) Notice: Subject to any disclaimer, the term of this patent is extended or adjusted under 35 U.S.C. 154(b) by 1030 days.

(21) Appl. No.: 17/547,872

(22) Filed: Dec. 10, 2021

(65) Prior Publication Data

US 2023/0183938 A1 Jun. 15, 2023

(51) Int. Cl.

| | |
|---|---|
| ***E02F 5/08*** | (2006.01) |
| ***B28D 1/04*** | (2006.01) |
| ***E02F 5/14*** | (2006.01) |

(52) U.S. Cl.

CPC ................ *E02F 5/08* (2013.01); *B28D 1/045* (2013.01); *E02F 5/14* (2013.01)

(58) Field of Classification Search

CPC ... E02F 5/08; E02F 5/14; B28D 1/045; B28D 1/04; B23D 61/02; B23D 61/021; B23D 61/0212; B23D 61/0214; B23D 61/022; B23D 61/0225; B23D 61/023; B23D 61/025; B23D 61/0275; B23D 61/04; B23D 61/06; B23D 61/065; B23D 61/071; Y10T 83/9319; Y10T 83/9326; Y10T 83/9329; Y10T 83/9346; Y10T 83/9348; Y10T 83/935; Y10T 83/9353; Y10T 83/9355; Y10T 83/9358; Y10T 83/936; Y10T 83/9362; Y10T 83/9365; Y10T 83/9367

See application file for complete search history.

(56) References Cited

U.S. PATENT DOCUMENTS

| | | | | | |
|---|---|---|---|---|---|
| 1,711,102 | A * | 4/1929 | Sierra, Jr. | B23D 61/025 | 83/854 |
| 4,232,580 | A * | 11/1980 | Stewart | B23D 61/025 | 83/835 |
| 4,848,205 | A * | 7/1989 | Suzuki | B23D 61/04 | 83/835 |
| 5,758,561 | A * | 6/1998 | Curtsinger | B23D 61/04 | 83/835 |
| 6,450,075 | B1 * | 9/2002 | Manzo | B23D 59/02 | 83/171 |
| D640,290 | S | 6/2011 | Stellman et al. | | |
| 2002/0195869 | A1 | 12/2002 | Dybsetter | | |
| 2004/0149114 | A1 * | 8/2004 | Brach | B23D 61/021 | 83/835 |
| 2005/0235798 | A1 * | 10/2005 | Weber | B28D 1/041 | 83/835 |

(Continued)

*Primary Examiner* — Phong H Nguyen

(74) *Attorney, Agent, or Firm* — TechLaw Ventures, PLLC; Terrence J. Edwards

(57) ABSTRACT

Microtrenching blades and methods of manufacturing the same. A blade a first blade portion comprising a center arbor bore defining a hole through the blade and a second blade portion comprising a plurality of blade segments, wherein the second blade portion is distal to the first blade portion relative to the center arbor bore. The blade includes a plurality of blade scoops disposed around a perimeter of the blade. The blade is such that the plurality of blade segments and the plurality of blade scoops are arranged such that two of the plurality of blade segments are separated by a blade scoop.

20 Claims, 22 Drawing Sheets

(56) References Cited

U.S. PATENT DOCUMENTS

| | | | | |
|---|---|---|---|---|
| 2009/0263195 | A1 | 10/2009 | Horan et al. | |
| 2009/0302668 | A1 | 12/2009 | Stratti | |
| 2012/0132052 | A1* | 5/2012 | Chen | B23D 61/023 83/838 |
| 2012/0167420 | A1 | 7/2012 | Fader et al. | |
| 2015/0020418 | A1 | 1/2015 | Clift | |
| 2015/0218777 | A1 | 8/2015 | Sewell et al. | |
| 2015/0239052 | A1* | 8/2015 | Trumble | B23D 61/04 83/835 |
| 2016/0263774 | A1 | 9/2016 | Runquist et al. | |
| 2019/0085515 | A1 | 3/2019 | Cochran | |

* cited by examiner

EXTENDED SCOOPED TRENCHING BLADE

TECHNICAL FIELD

This application is directed to drilling and trenching and is particularly directed to trenching blades and cutters.

BACKGROUND

Advances in drilling technology have led to advances in drilling bits and drilling cutters. Drilling and sawing machinery is used to drill or saw holes through rock, dirt, and other substances. Drilling and sawing machinery can be deployed for cutting trenches, drilling holes for petroleum, natural gas, water, salt, and other substances, for scientific explorations, for sampling subsurface mineral deposits and other physical properties, and for installing subsurface fabrications such as underground utilities, tunnels, wells, and more.

Different drilling or sawing techniques are used for different drilling applications and drilling substrates. Example drilling techniques include auger drilling, percussion rotary air blast drilling, reverse circulation drilling, diamond core drilling, direct push drilling, trenching, microtrenching and hydraulic rotary drilling. These varying drilling and sawing techniques use different equipment and different types of drill bits, drilling heads, or blades.

In some instances, it is necessary to cut a trench in a hard material such as asphalt, concrete, or other material where an underground material may be laid. Trenching can be particularly necessary when laying underground cables to meet the increasing demand for bandwidth and power. To reduce the disruption to existing roads, sidewalks, and buildings, it can be beneficial to "microtrench" a surface by cutting a narrow trench for receiving a cable. Traditionally, microtrenching is performed with a blade or saw wheel. However, blades can quickly wear out and become dull when cutting through a hard material such as asphalt or concrete. Therefore, there is a need for improved microtrenching blades and materials.

In light of the foregoing, disclosed herein are improved systems, methods, and devices for microtrenching blades.

BRIEF DESCRIPTION OF THE DRAWINGS

Non-limiting and non-exhaustive implementations of the disclosure are described with reference to the following figures, wherein like reference numerals refer to like parts throughout the various views unless otherwise specified. Advantages of the disclosure will become better understood with regard to the following description and accompanying drawings where.

DETAILED DESCRIPTION

Figure 1A:
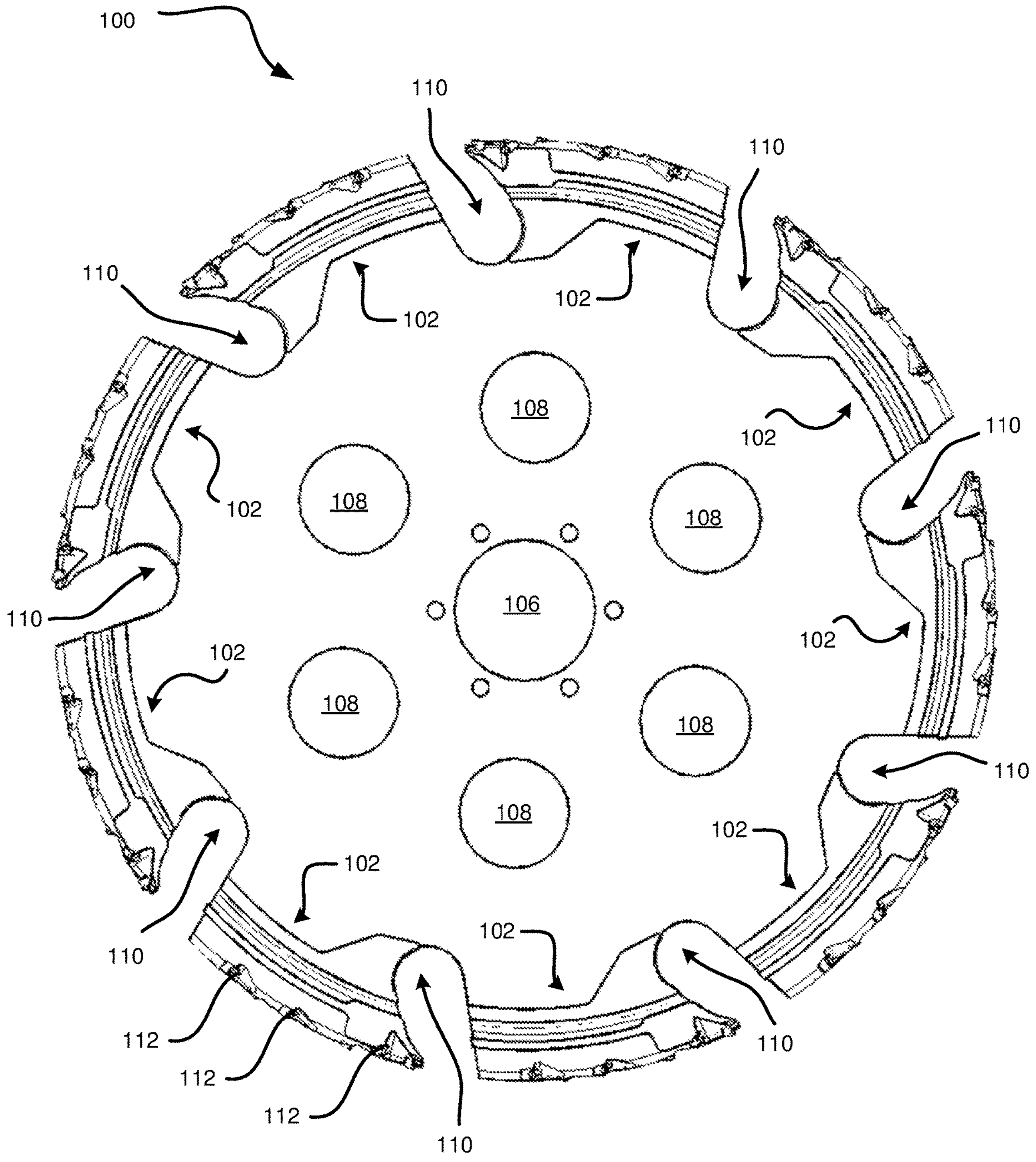
FIG. 1A is a primary straight-on view of a side of a blade with extended scoops and a progressive cutter configuration.

Disclosed herein are systems, methods, and devices for improved blades, and specifically for improved trenching blades that can be implemented in microtrenching applications. The systems, methods, and devices described herein exhibit improved excavation abilities for a variety of materials (including, for example, rock, dirt, concrete, and asphalt) in both wet and dry trenching conditions. Additionally, the systems, methods, and devices described herein exhibit increased durability when compared with traditional configurations for microtrenching blades.

Disclosed herein is a blade comprising a blade body with a cutting edge disposed around a perimeter of the blade body. The blade body may be constructed with a first piece of material forming a first body portion and a second piece of material forming a second body portion, wherein the second body portion may be referred to as a "blade segment" herein. The blade segment may be welded to the first portion such that the blade body includes each of the first portion and the second portion (blade segment). The cutting edge disposed around the perimeter of the blade body may be constructed of the blade segment. The cutting edge of the blade includes a width extending from side to side. The cutting edge of the blade includes a centerline extending around the perimeter of the blade, wherein the centerline is perpendicular to an axis for the width of the cutting edge.

The disclosure extends to blades with a progressive cutter configuration. The cutting edge of the blade includes a plurality of cutters disposed therein. The cutters may be permanently or removably affixed to the blade. The cutters are configured and optimized for shearing material such as concrete, asphalt, rock, and dirt. The cutters are attached to the cutting edge of the blade in a progressive configuration such that each cutter performs equal work or near-equal work during operation. The cutters are attached to the cutting edge of the blade at different positions across the width of the cutting edge. In some implementations, the cutters are attached to the cutting edge in alternating positions relative to the center line, such that adjacent cutters are position at opposite ends of the centerline. The cutters are further attached to the cutting edge at varying back rack angles.

The disclosure extends to blades with partitioned blade segments. The cutting edge of the blade is separated into a plurality of blade segments. The plurality of blade segments may be further partitioned into a leading blade segment and a trailing blade segment or multiple leading and trailing segments, wherein the blade comprises a plurality of leading/trailing blade segment pairs.

The disclosure extends to blades with extended scoops. The cutting edge of the blade comprises scoops cut therein to increase the excavating abilities of the blade. The extended scoops described herein exhibit increased excavation success in certain implementations, and specifically when excavating harder materials such as rock and compacted dirt. The extended scoops are cut into the blade body at an angle that is non-parallel to a radial line extended through a center point of the blade body. The angle of the extended scoops is optimized based on the material being excavated and the direction of rotation for the blade. The extended scoops described herein further increase the effectiveness of the blade in quickly and effectively excavating material with fewer pauses and increased durability.

Microtrenching is a specialized form of trenching that is particularly useful for cutting a narrow trench for receiving cables such as fiber optic cables, electrical cables, and so forth. Microtrenching is often performed in hard materials such as asphalt, concrete, rock, compacted dirt, or some other material where a cable may be laid. Microtrenching is an emerging technology that is being developed in response to a need to provide increased bandwidth and power to areas that have previously been developed. Microtrenching provides many benefits over traditional trenching methods. Microtrenching minimizes the disruption to existing structures by cutting only a narrow trench that is sized for receiving a cable. Additionally, microtrenching hastens the trenching process by efficiently cutting the trench with a rotary blade.

Microtrenching can be executed with a rotary blade that is pressed against the cutting surface. In an embodiment, a microtrenching blade is fitted with cutters. The cutters may be polycrystalline diamond compact (PDC) cutter bits. There are two primary factors that provide the greatest value performance in a microtrenching blade. One is the rate of penetration (ROP), or the speed with which a the microtrenching blade can fail rock. Another factor is durability of the microtrenching blade. The systems, methods, and devices disclosed herein for microtrenching blade configurations improve each of these factors.

Microtrenching blades are typically from one to six inches wide and configured to excavate narrow trenches that are also from one to six inches across. Microtrenching blades typically have a relatively large diameter when compared with saw blades and other trenching blades. Microtrenching blades may specifically have a diameter from two feet to six feet across. It should be appreciated that the diameter and width of microtrenching blades may vary depending on the application. The dimensions of a microtrenching blade are optimized to create the least disruption in the formation while creating a trench that is sufficiently wide and deep for receiving a material such as a fiber optic cable, electric cable, telecom cable, and so forth. Therefore, the microtrenching blade may be optimized to create the smallest possible trench that is still sufficiently large for the intended purpose.

The microtrenching blades described herein include a plurality of cutters. One embodiment of the cutter is referred to as a "plowing cutter," so named because of the plowing action executed by the cutter. The plowing cutter improves operation of the microtrenching blade. The plowing cutter shears rock using a plowing action that maximizes the rate of penetration in soft to medium soft formations. The plowing cutter requires less torque than a standard round cutter. The plowing cutter can yield performance improvements in microtrenching applications in the form of increased rate of penetration and decreased power requirements to turn the microtrenching blade.

In an embodiment, cutters are removably attached to a microtrenching blade such that the cutters are field replaceable. The microtrenching blade and the cutters secured to the microtrenching blade will inevitably dull and fail during operation of the microtrenching blade. Therefore, there are numerous benefits enabled by ensuring the cutters are easily removable and field replaceable by operators of the microtrenching blade.

The cutters described herein are sufficiently hard and durable for executing a microtrenching operation. The hardness and durability of the cutter may be optimized based on manufacturing cost and intended application. The cutters described herein may be constructed of, for example, polycrystalline diamond compact (PDC), tungsten carbide, silicon carbide, cemented carbide, steel, titanium carbide, tungsten, boron carbide, diamond, and so forth. The cutters may be constructed of a material comprising a hardness equal to or exceeding the hardness of polycrystalline diamond compact.

The cutters may specifically be constructed of a superhard material with a hardness value exceeding 40 gigapascals when measured by the Vickers hardness test. The cutters may be constructed of a material with a hardness value from about 60-150 gigapascals when measured by the Vickers hardness test. The Vickers hardness test was developed by Robert L. Smith and George E. Sandland to measure the hardness of materials. The Vickers hardness test measures the material's ability to resist plastic deformation from a standard source. The unit of hardness given by the test is known as the Vickers Pyramid Number (HV) or Diamond Pyramid Hardness (DPH) and can be converted to SI units (gigapascals). The cutters may be constructed of a material with a hardness of at least 7 on the Mohs hardness scale and may specifically be constructed of a material with a hardness of at least 8.5 on the Mohs hardness scale.

In an embodiment, a microtrenching blade includes a plurality of cutters disposed therein. In an embodiment, the cutters are polycrystalline diamond compact (PDC) cutters. The cutters may be attached to the microtrenching blade at a back rake angle. The use of a back rake with the cutter improves the rate of penetration and the durability of the microtrenching blade. In an embodiment, the back rake of the cutter on the microtrenching blade is from one degree to up to 15 degrees. In an embodiment, the back rake of the cutter on the microtrenching blade is greater than 15 degrees. In an embodiment, the back rake of the cutter on the microtrenching blade is five degrees. The back rake of the cutter on the microtrenching blade provides significant performance and durability advantages over traditional microtrenching blades.

In an embodiment, a microtrenching blade includes staggered cutters in the arrangement of a staggered microtrenching blade. The staggered microtrenching blade may be used for cutting wider trenches without manufacturing a blade with a greater width. In an embodiment, two or more microtrenching blades are indexed together to allow for a greater width trench to be cut. The indexing of the blades may create a staggered cutter design that improves the rate of penetration and durability of the microtrenching blade and can further reduce blade chatter. Additionally, the indexing of the blades can decrease the torque required to turn the microtrenching blade.

In an embodiment, larger cutters of a microtrenching blade can be used on a smaller microtrenching blade to allow for cutting a larger trench. This can increase the width of the trench that can be cut by a microtrenching blade without changing the size of the microtrenching blade itself.

For the purposes of promoting an understanding of the principles in accordance with the disclosure, reference will now be made to the embodiments illustrated in the drawings and specific language will be used to describe the same. It will nevertheless be understood that no limitation of the scope of the disclosure is thereby intended. Any alterations and further modifications of the inventive features illustrated herein, and any additional applications of the principles of the disclosure as illustrated herein, which would normally occur to one skilled in the relevant art and having possession of this disclosure, are to be considered within the scope of the disclosure claimed.

Before the systems, methods, and devices for an improved microtrenching blade are disclosed and described, it is to be understood that this disclosure is not limited to the particular structures, configurations, process steps, and materials disclosed herein as such structures, configurations, process steps, and materials may vary somewhat. It is also to be understood that the terminology employed herein is used for the purpose of describing particular embodiments only and is not intended to be limiting because the scope of the disclosure will be limited only by the appended claims and equivalents thereof.

In describing and claiming the subject matter of the disclosure, the following terminology will be used in accordance with the definitions set out below.

It must be noted that, as used in this specification and the appended claims, the singular forms "a," "an," and "the" include plural referents unless the context clearly dictates otherwise.

As used herein, the terms "comprising," "including," "containing," "characterized by," and grammatical equivalents thereof are inclusive or open-ended terms that do not exclude additional, unrecited elements or method steps.

As used herein, the phrase "consisting of" and grammatical equivalents thereof exclude any element or step not specified in the claim.

As used herein, the phrase "consisting essentially of" and grammatical equivalents thereof limit the scope of a claim to the specified materials or steps and those that do not materially affect the basic and novel characteristic or characteristics of the claimed disclosure.

Figure 1B:
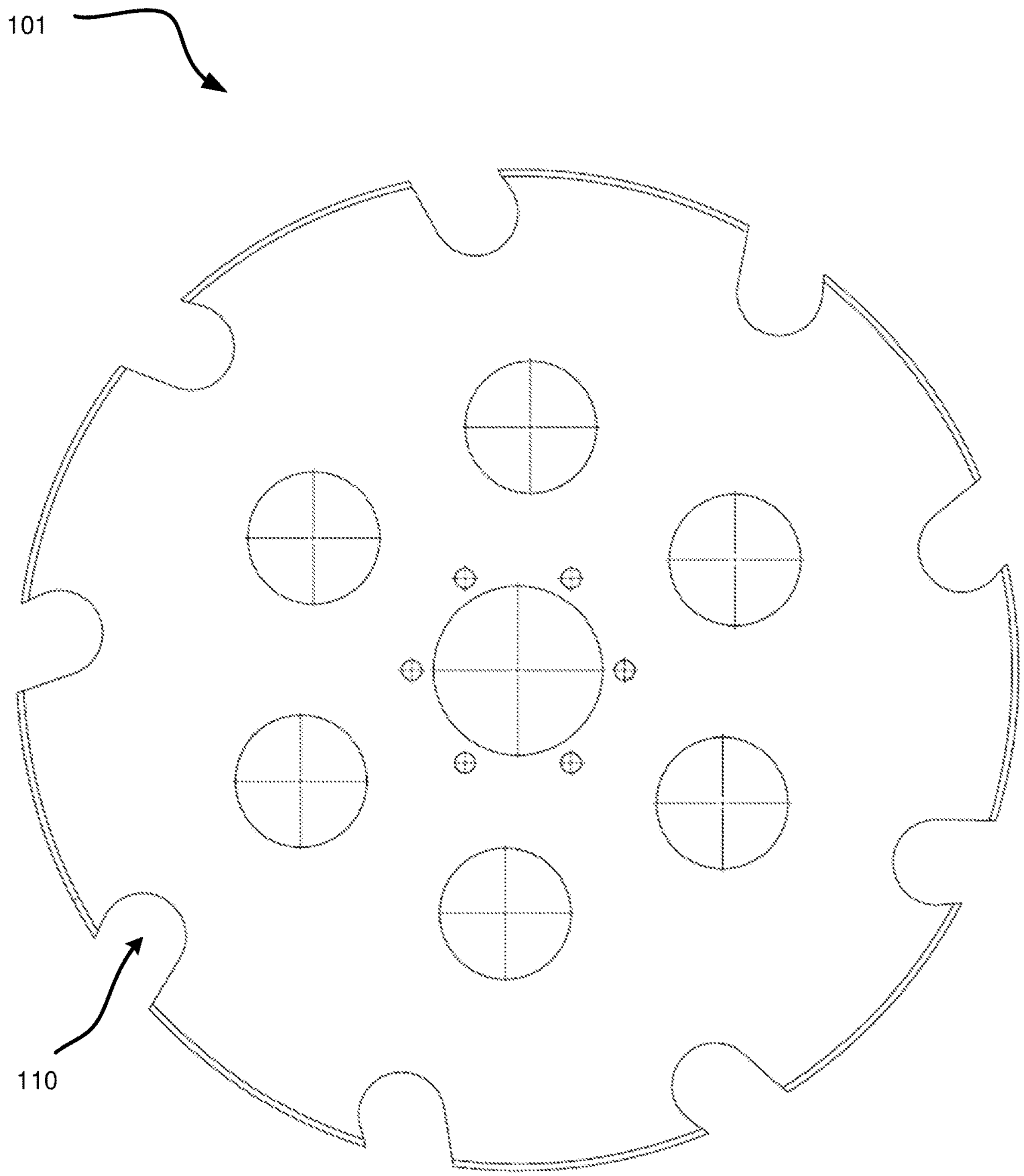
FIG. 1B is a primary straight-on view of a side of a first portion of a blade body.

Now referring to the figures, FIG. 1A is a primary straight-on view of a side of a blade 100. FIG. 1B illustrates a primary straight-on view of a side of a body of the blade 100, wherein only a first portion 101 of the blade body is shown and a second portion of the blade body is omitted. As discussed herein, a "blade body" may include each of the first portion 101 of the blade 100 and may further include a second portion of the blade 100 (which may be referred to as a "blade segment" herein) that is attached to the first portion 101. The first portion 101 of the blade body (illustrated in FIG. 1B) may be a disc and does not include blade segments or cutters attached thereto. The second portion of the blade body includes the blade segments 102 and may be welded to the first portion 101 of the blade body. In an embodiment, the entire blade 100, including the first portion 101 and the blade segment 102 portions, are built as a single metal piece. The entire blade 100 may be machined from one piece of metal rather than a multiple-piece assembly.

The blade 100 may specifically be implemented in microtrenching applications wherein a narrow trench is dug and excavated. The blade may be sized and configured for excavating a trench with a relatively narrow width, such as 0.5-3 inches across. In some cases, for example when the trench is excavated for laying fiber optic cable, the trench needs to be deep enough to safely lay the cable. In these cases, the microtrench blade may have a diameter from 3 ft to 6 ft to enable the excavated trench to have a depth from 3 inches to 3 ft depending on the implementation. The blade 100 illustrated in FIG. 1A is optimized for digging in hard materials such as rock and compacted dirt.

The blade 100 includes a cutting edge extending around the perimeter of the blade. The cutting edge of the blade 100 includes the portion of the blade that contacts the material during operation. The blade 100 includes a plurality of blade segments 102. The embodiment illustrated in FIG. 1A includes extended scoops for improving the effectiveness of the blade for excavating dirt, rock, and other materials. In the implementation illustrated in FIG. 1A, each blade segment 102 is separated by a scoop 110. The cutting edge of the blade segments 102 include one or more cutters 112 attached thereon.

The blade 100 includes a center arbor bore 106 and a plurality of periphery bores 108. The center arbor bore 106 and the plurality of periphery bores 108 represent cutouts within the body of the blade 100. The center arbor bore 106 is configured to receive a corresponding cylinder on microtrenching equipment for stabilizing and rotating the blade. The blade rotates about an axis of rotation that is perpendicular to the center arbore bore 106 (such that the axis of rotation goes into and out of the page in the illustration in FIG. 1A. The periphery bores 108 are implemented to decrease the overall weight of the blade 100. This decreases the work that must be performed by the microtrenching equipment when rotating the blade, and further increases user experience when transporting and exchanging the blades.

The blade 100 is constructed of a rigid material and may specifically be constructed of steel. The blade 100 may be constructed of, for example, medium carbon steel, low-alloy manganese, or high carbon steel. The blade 100 is configured to successfully cut and excavate through dirt, rocks, concrete, asphalt, and other materials.

The blade 100 includes a blade body, which is made up of the first portion 101 and the blade cap. The first portion 101 includes the central disc portion of the blade (illustrated best in FIG. 1B). The first portion 101 may be constructed of a single piece of material such as steel. The blade may further include the blade cap, which includes the blade segments 102 and the cutting edge of the blade 100. The blade segments 102 may be manufactured independently of the first portion 101 and then welded or otherwise permanently affixed to the first portion 101. In an embodiment, the width of the cutting edge of the blade 100 is greater than a thickness of the first portion 101 of the blade 100. In an alternative embodiment, the entire blade body, including the first portion 101 and the blade cap, are manufactured as a single piece of material.

As shown in FIG. 1B, the scoops 110 are formed by a combination of the blade segments 102 and the first portion 101. In an implementation, the depth of the scoops 110, measured from the cutting edge of the blade 100 to an interior-most position of the scoops 110, is made up of a combination of the blade segments 102 (which are attached to the first portion 101 and increase an overall diameter of the blade body) and the first portion 101 itself. As shown in FIG. 1B, at least a portion of the scoops 110 are machined into the first portion 101. In an implementation, the depth of the scoops 110 consist of a first part that is machined into the first portion 101 and further consist of a second part, which is created by the blade segments 102. The blade 100 may be manufactured such that 30-50% of the depth of the scoop 110 is machined into the first portion 101 of the blade body.

Figure 1C:
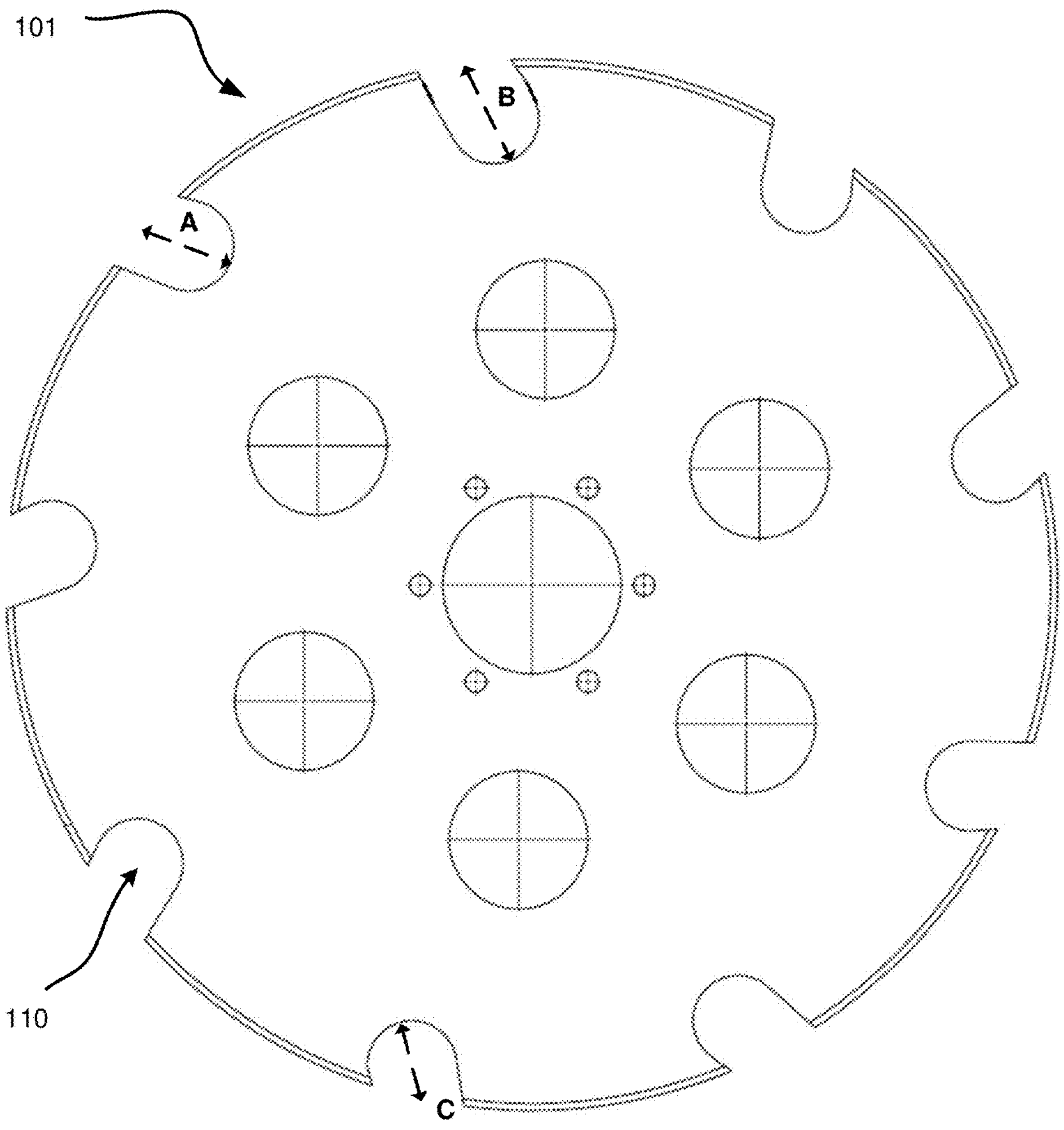
FIG. 1C is a primary straight-on view of a side of a first portion of a blade body showing blade scoops having differing depths.

As shown in FIG. 1C, at least one of the scoops 110 may comprise a different depth than the other scoops 110. For example, in FIG. 1C, Depth A is illustrated as having a different depth than Depth B, and Depth B is illustrated as having a different depth than Depth C. The plurality of blade scoops 110 may comprise varying depths such that two or more of the plurality of blade scoops comprise a different depth. While FIG. 1C shows three different depths in three different scoops, one of ordinary skill will appreciate that any combination of the plurality of scoops 110 may comprise the same or a different depth according to the needs of the user.

Figure 2:
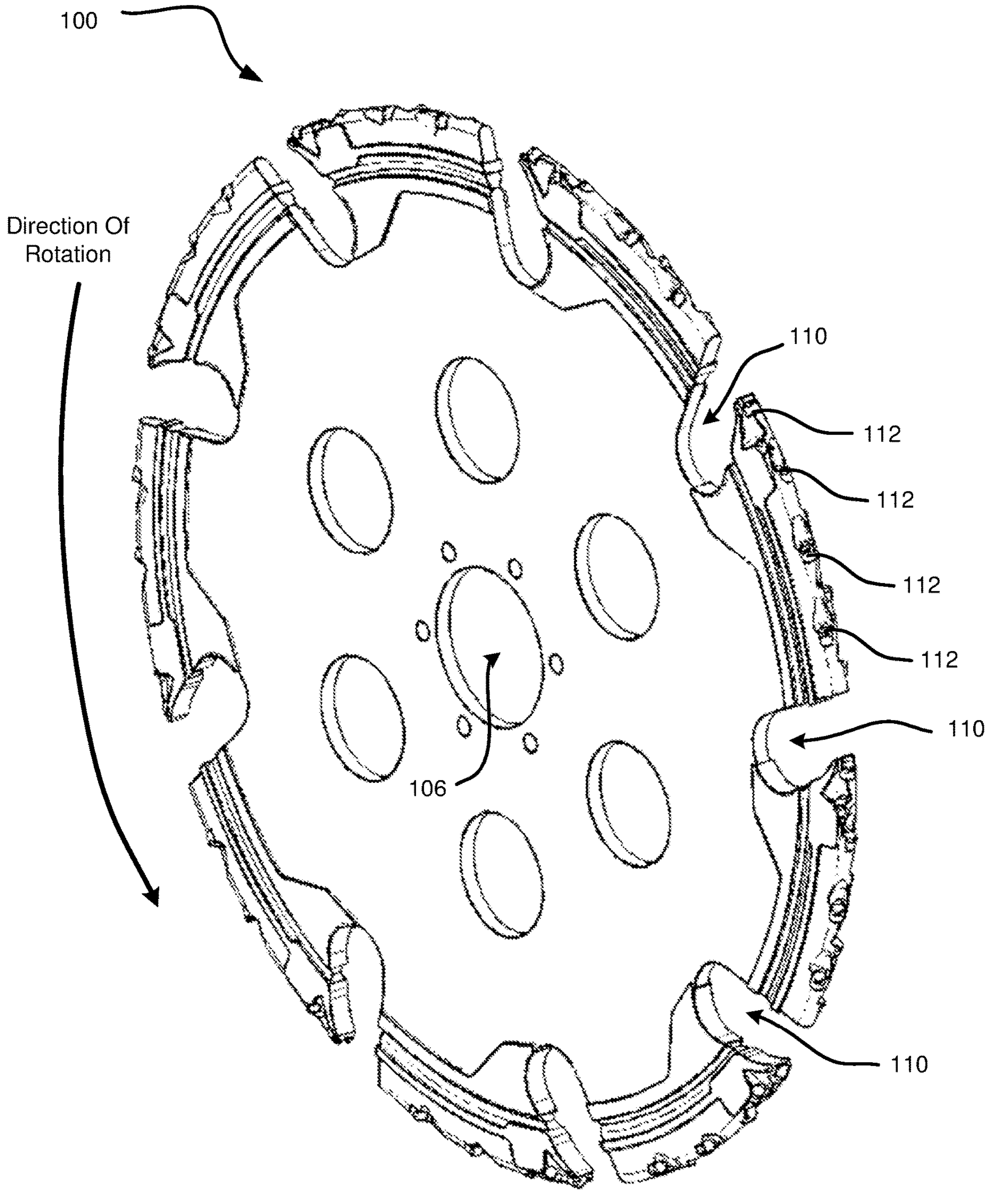
FIG. 2 is a perspective view of a blade with extended scoops and a progressive cutter configuration.

FIG. 2 is a perspective view of the blade 100. The scoops 110 of the blade are cut into the body of the blade 100 from the perimeter of the blade 100 toward the center arbor bore 106. The scoops 110 are configured for collecting and excavating dirt, mud, rocks, and other materials when the blade 100 is in use.

Figure 3:
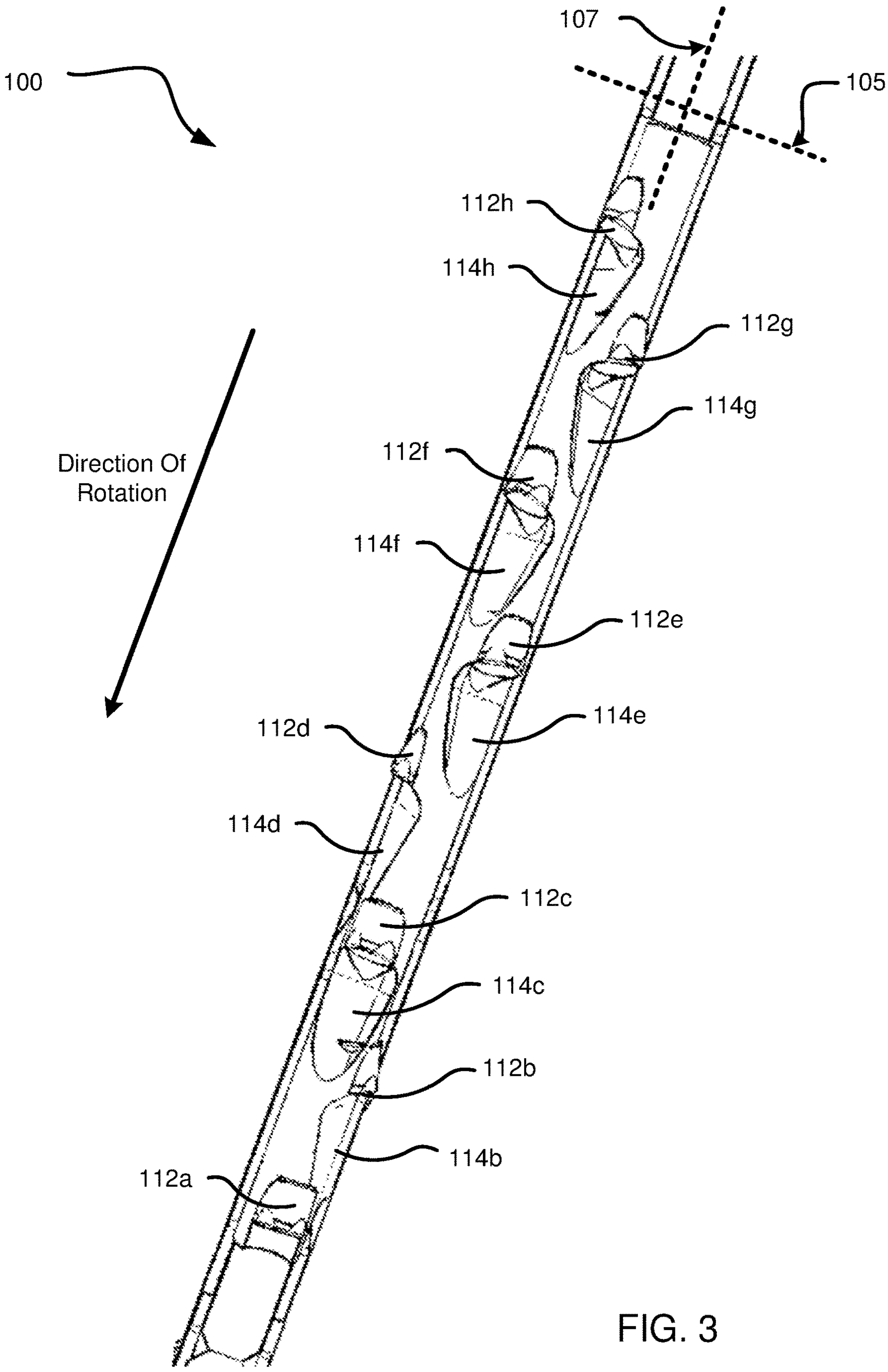
FIG. 3 is a primary straight-on view of a portion of a cutting edge of a blade with a progressive cutter configuration.

FIG. 3 is a primary straight-on view of a cutting edge of the blade 100. In FIG. 3, the view is cropped such that only a portion of the blade 100 is visible, and specifically such that one blade segment 102 is shown. The blade segment 102 includes a plurality of cutters 112 and a plurality of cutter trenches 114. The cutters 112 are arranged such that each cutter performs an equal portion of the work when excavating dirt, rock, concrete, asphalt, or other materials. The cutters 112 may specifically be referred to as "shearing cutters" because they are configured to shear off small pieces of material when the blade 100 is in use.

The blade segment 102 illustrated in FIG. 3 includes eight cutters 112. It should be appreciated that the blade 100 may be constructed in any suitable manner depending on the application, with varying quantities of cutters on each blade segment 102. The blade segment 102 includes the eight independent cutters 112, and seven of those cutters 112 is preceded by a cutter trench 114. The foremost cutter 112*a* (the first cutter 112 within the blade segment 102 to shear material when the blade 100 is rotating) does not include a cutter trench 114 because the foremost cutter 112*a* is located at an edge of the blade segment 102. The blade segment 102 includes each of cutters 112*a*, 112*b*, 112*c*, 112*d*, 112*e*, 112*f*, 112*g*, and 112*h*. The cutters 112*b*-112*h* include a corresponding cutter trench 114 that precedes the cutter 112 when the blade 100 is rotating. The cutter trenches include 114*b*, 114*c*, 114*d*, 114*e*, 114*f*, 115*g*, and 114*h*.

The cutters 112 may be constructed of diamond or another hard material. The cutters 112 may be manufactured independently of the blade 100 and then installed into the blade 100. The cutters 112 may be constructed of polycrystalline diamond compact (PDC) or carbide. In some implementations and depending on what material will be sheared and excavated, the polycrystalline diamond compact cutter shows greater durability when compared with the carbide cutter.

The dimensions of the cutters 112 are optimized based on the type of material that will be sheared and excavated during the microtrenching operation. In an embodiment, the width of the blade 100 is one inch, and each cutter is roughly one-half inch. In various embodiments, the cutters may include any width ranging from 8 mm to 30 mm.

The scoop 110 is cut into the body of the blade 100 at an angle that is offset from a radial line (wherein the radial line extends from the center point to the perimeter and is perpendicular to the perimeter of the blade 100). Because the scoop 110 is offset from the radial line, the blade segment 102 extends over a portion of the scoop 110. The offset angle of the scoop 110 increases the effectiveness of the scoop 110 and enables the scoop to successfully excavate a greater quantity of material. In various embodiments, the scoop 110 may be configured such that a plurality of the cutters 112 on the blade segment are disposed "over" the scoop. In the embodiment illustrated in FIG. 4, each of the cutter 112*a*, cutter 112*b*, and cutter 112*c* is located over the scoop 110.

Figure 19:
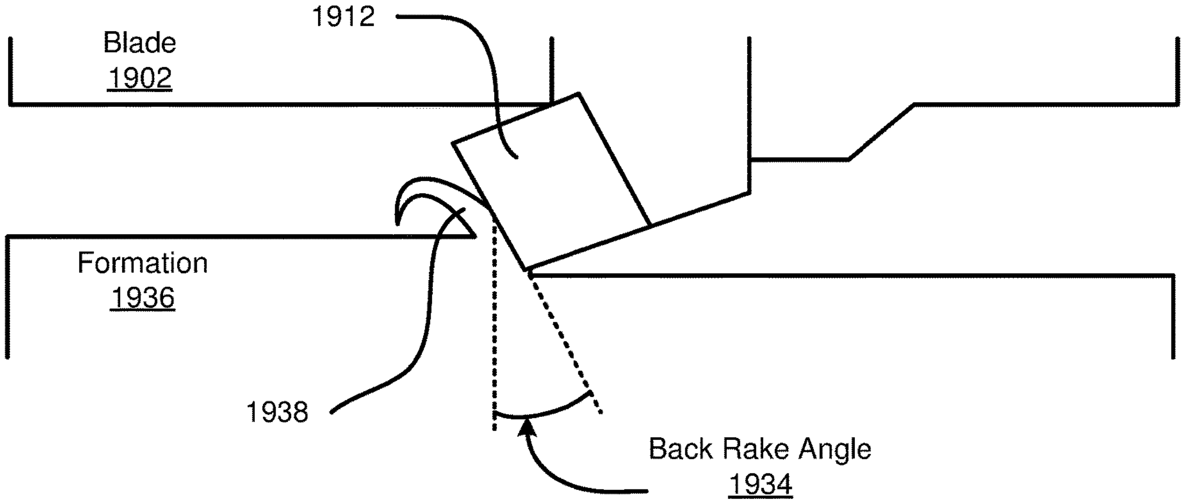
FIG. 19 is a schematic illustration of a cutter shearing a formation at a back rake angle.

The cutters are orientated with a back rake angle (the back rake angle is illustrated in FIG. 19). Each of the cutters 112 may have a different back rake angle. In an embodiment, the back rake angles of the cutters 112 vary within a defined range that is optimized based on the type of material that is being sheared and excavated. In an embodiment, the back rake angles of the cutters 112 range from 0 degrees to 20 degrees and may specifically range from 5 degrees to 15 degrees. The blade 100 may include one, two, three, or more different back rake angles across the plurality of cutters 112 disposed within the blade. The blade 100 is more efficient and demonstrates greater durability when the cutters 112 are installed with varying back rake angles to equally distribute the work of shearing material during the microtrenching operation.

The cutting edge of the blade 100 includes a width 105, which is measured from a first side of the blade 100 to a second side of the blade, across the cutting edge as illustrated in FIG. 3. The cutting edge of the blade 100 further includes a centerline 107 that is perpendicular to the axis for measuring the width 105 of the cutting edge. The centerline 107 runs around the perimeter of the cutting edge. The cutters 112 are positioned on the cutting edge of the blade 100 such that a portion of the cutters are on a first side of the width 105, and another portion of the cutters are on a second side of the width 105 relative to the centerline 107. The cutters 112 may alternate such that neighboring cutters are on opposite sides of the width of the cutting edge.

The cutters 112 are constructed of a material that is sufficiently hard for excavating a formation comprising one or more of dirt, rock, compacted dirt, mud, asphalt, concrete, and so forth. The cutters 112 may specifically have a hardness value equal to or exceeding the hardness value of polycrystalline diamond compact (PDC). The cutters 112 may have a surface area hardness value equal to or exceeding 40 gigapascals when measured with the Vickers hardness scale. Specifically, the cutters 112 may have a surface area hardness value equal to or exceeding 60 gigapascals when measured with the Vickers hardness scale.

Figure 4:
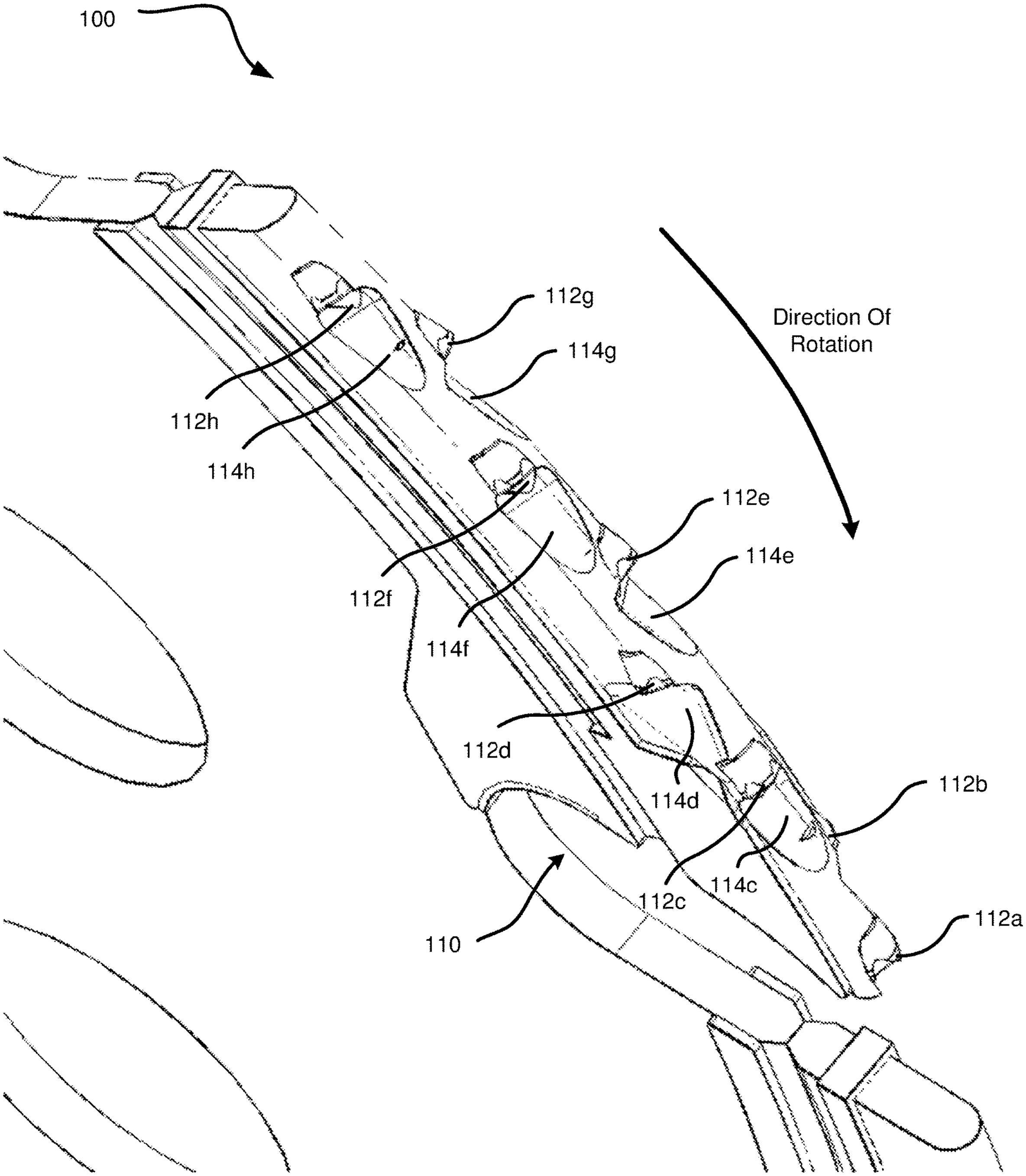
FIG. 4 is a perspective view of a portion of a blade with extended scoops and a progressive cutter configuration.

FIG. 4 is a perspective view of a portion of the blade 100, and specifically illustrates one blade segment 102 of the blade 100. The blade segment 102 includes the plurality of cutters 112 and plurality of cutter trenches 114. The cutters 112 are offset relative to one another and are not located side-by-side across the width of the blade 100. This increases the effectiveness of each cutter 112 and reduces the total work that must be performed by each cutter 112. This increases the durability and longevity of the cutters 112 themselves and the blade 100 overall.

In an embodiment, the cutters 112 are offset relative to one another along the cutting edge of the blade 100. The cutting edge of the blade 100 includes a width, and the width of the cutting edge is optimized and selected based on the implementation. For example, when the blade 100 is implemented for digging a microtrench for laying fiber optic cable, the width of the cutting edge of the blade may be one inch, 1.5 inches, or two inches depending on the preference. The width of the cutting edge includes a first side and a second side, wherein the second side is opposite the first side. In an embodiment, a first cutter is located near the first side of the width, a second cutter is located near the second side of the width, a third cutter is located near the first side of the width, a fourth cutter is located near the second side of the width, a fifth cutter is located near the first side of the width, a sixth cutter is located near the second side of the width, and so on. In this embodiment, the cutters 112 alternate sides of the cutting edge around the perimeter of the blade 100.

The cutters 112 are configured to perform equal work when the blade 100 is in use. The location, orientation, and rake angles of the cutters may be altered and optimized depending on the type of material that is being sheared and excavated.

Figure 5:
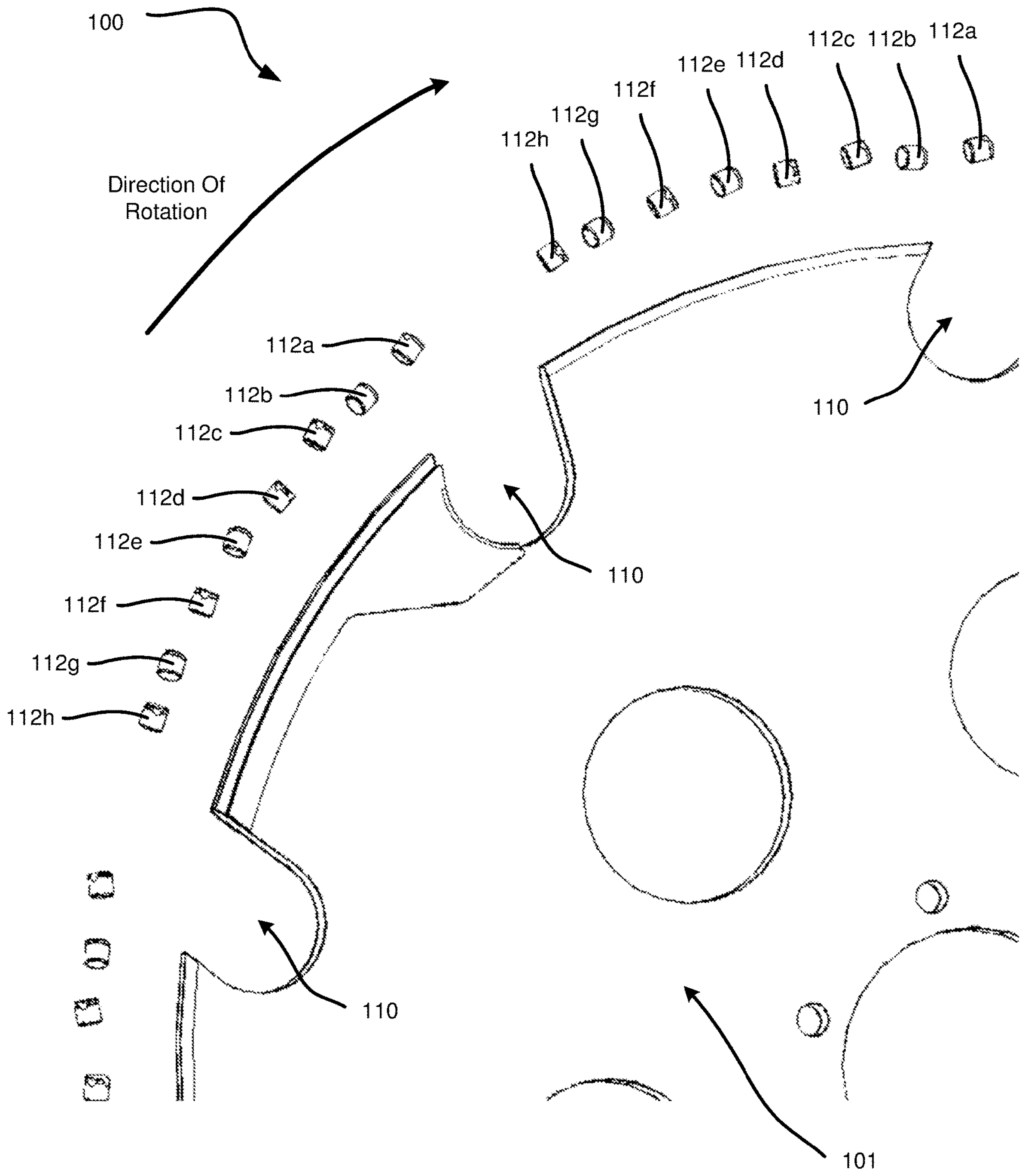
FIG. 5 is a primary straight on view of a side of a portion of a blade with extended scoops and a progressive cutter configuration, wherein a cutter sleeve is omitted to illustrate cutter configuration and orientation.

FIG. 5 is a primary straight-on view of a side of the blade 100, wherein the perimeter edge of the blade is removed to better illustrate the cutters 112 that are disposed within the cutting edge of the blade 100. The cutters 112 are relatively small when compared with the body of blade 100. The dimensions of the cutters 112 are optimized such that the width of the blade 100 can accommodate two cutters side-by-side or alternated along the cutting edge of the blade 100.

As illustrated in FIG. 5, the cutters 112*a*-112*h* are separately and independently manufactured components that are installed into the cutting edge of the blade 100. In various embodiments, the body of the blade 100 is constructed of steel, the cutters 112 are constructed of diamond or carbide, and the cutters 112 are installed into the cutting edge of the blade 100. The cutters 112 may be replaced to extend the life of the blade 100 or to optimize the blade 100 for different types of material. For example, in some implementations, a carbide cutter may be more effective than a polycrystalline diamond compact cutter, and vice versa, and in these cases it may be beneficial to have the capability of swapping the cutters 112.

Figure 6:
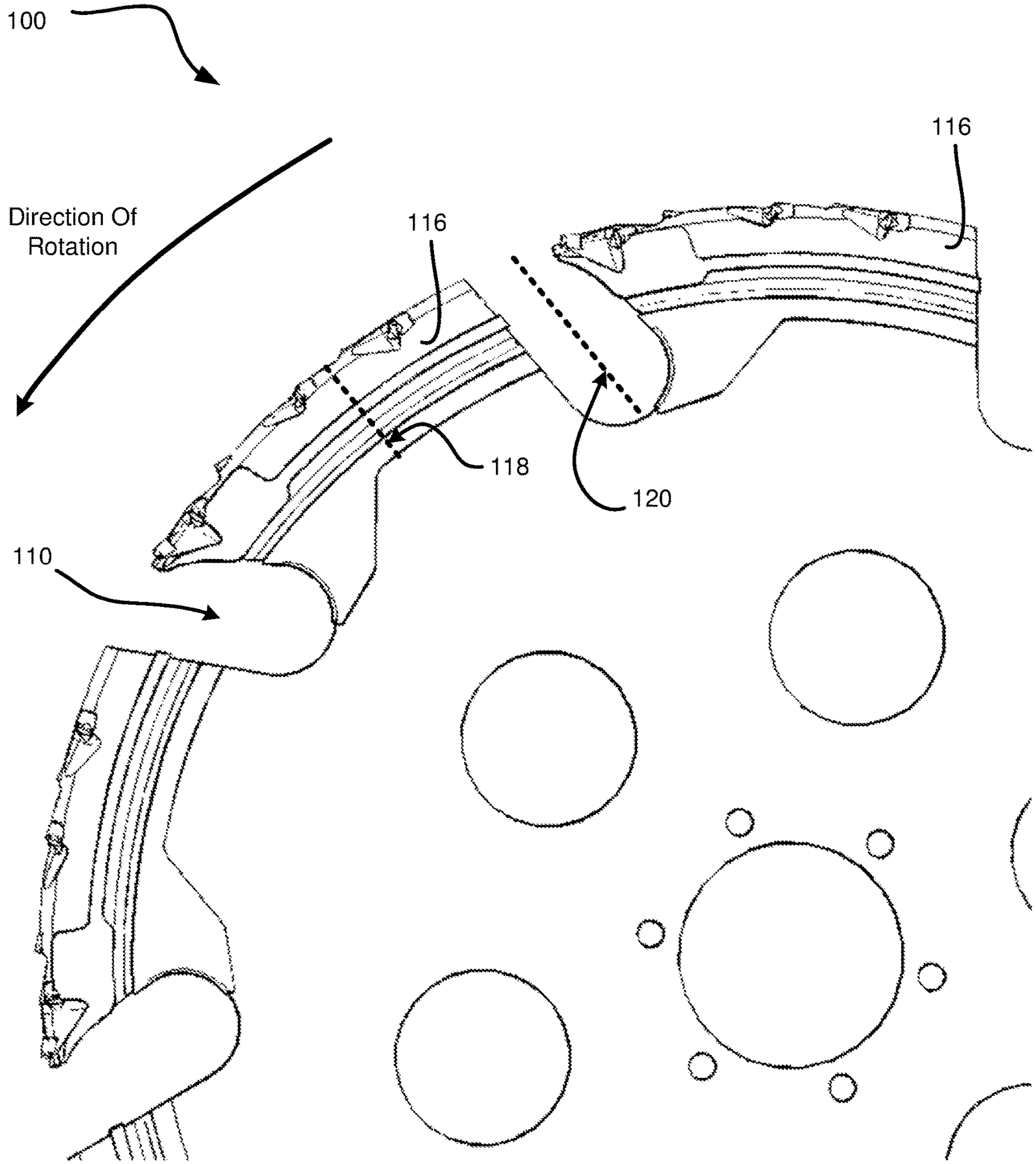
FIG. 6 is a primary straight-on view of a side of a portion of a blade with extended scoops and a progressive cutter configuration.

FIG. 6 is a primary straight-on view of a portion of a side of the blade 100. The blade 100 includes the blade cap comprising a blade segment depth 118. The blade 100 additionally includes a plurality of scoops 110 each having a scoop depth 120. In the embodiment illustrated in FIG. 6, the scoop depth 120 is greater than the blade segment depth 118. In an implementation, the scoop depth 120 is 30% greater than the blade segment depth 118. In various implementations, the scoop depth 120 may be from 10% to 60% greater than the blade segment depth 118.

Figure 7:
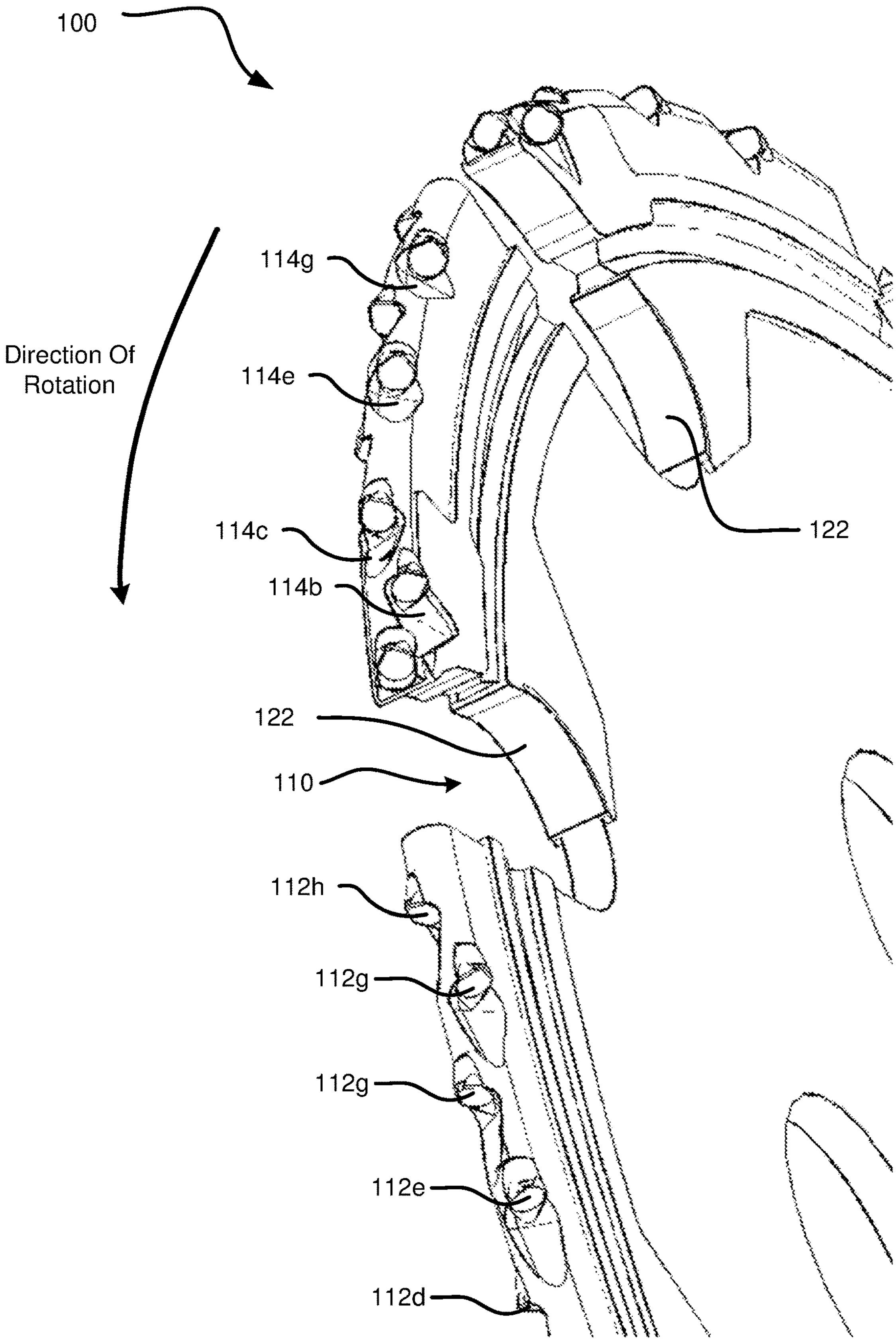
FIG. 7 is a perspective view of a portion of a blade with extended scoops and a progressive cutter configuration.

FIG. 7 is a perspective view of a portion of the blade 100. The scoops 110 of the blade 100 may include a scoop sleeve 122. The scoop sleeve 112 increases the width and rigidity of the scoop 110 portion of the blade 100. In an implementation, the scoop sleeve is a portion of an outer perimeter of the blade 100 that may be machined separately from the center body portion of the blade 100, and then subsequently welded together. The scoop sleeve 122 may be manufactured as a separate component and then welded to the scoop 110. In an alternative embodiment, the scoop sleeve 122 is manufactured as a single component with the body of the blade 100 to provide additional width and rigidity to the scoop 110.

Figure 8:
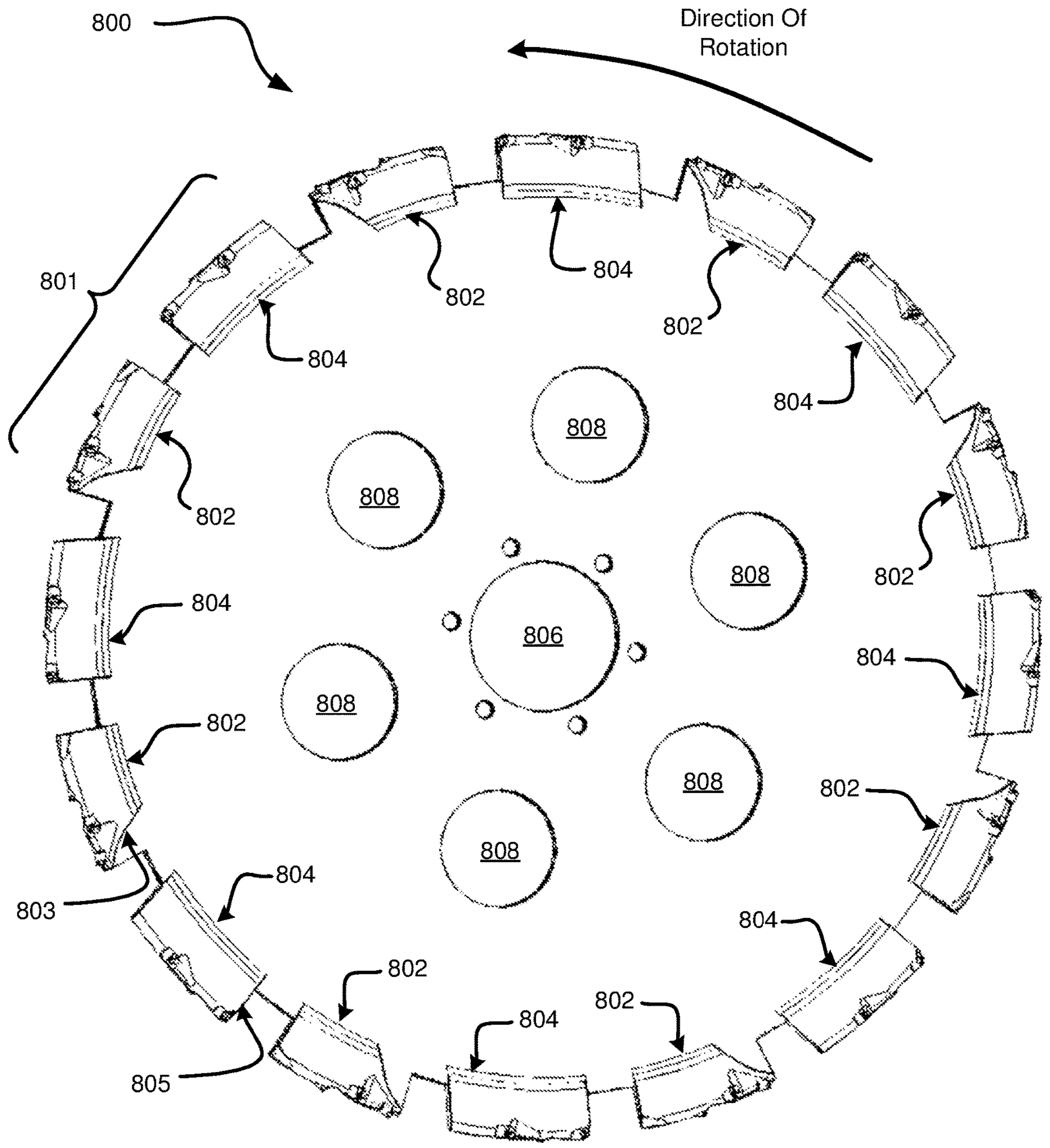
FIG. 8 is a primary straight-on view of a blade with partitioned blade segments and a progressive cutter configuration.

FIG. 8 is a primary straight-on view of a blade 800. The blade 800 may specifically be implemented in microtrenching applications wherein a narrow trench is dug and excavated. The blade may be sized and configured for excavating a trench with a relatively narrow width, such as 0.5-3 inches across. In some cases, for example when the trench is excavated for laying fiber optic cable, the trench needs to be deep enough to safely lay the cable. In these cases, the microtrench blade may have a diameter from 3 ft to 6 ft to enable the excavated trench to have a depth from 10 inches to 3 ft depending on the implementation. The blade 800 illustrated in FIG. 8 is optimized for digging in wet conditions.

The blade 800 includes a plurality of blade segments 801, wherein each blade segment 801 includes a leading blade segment 802 and a trailing blade segment 804. The blade 800 includes a center arbor bore 806 and a plurality of periphery bores 808. The center arbor bore 806 and the plurality of periphery bores 808 represent cutouts within the body of the blade 100. The bores 806, 808 are each configured to receive a corresponding cylinder on the microtrenching equipment.

The blade 800 is constructed of a rigid material and may specifically be constructed of steel. The blade 800 may be constructed of, for example, medium carbon steel, low-alloy manganese, or high carbon steel. The blade 800 is configured to successfully cut and excavate through dirt, rocks, concrete, asphalt, and other materials.

The leading blade segments 802 include a leaning edge 803. The leaning edge 803 comprises an angle that is non-perpendicular to the perimeter of the blade body. The trailing blade segments 804 include a squared edge 805, wherein the squared edge is normal or nearly normal to the perimeter of the blade body.

Figure 9:
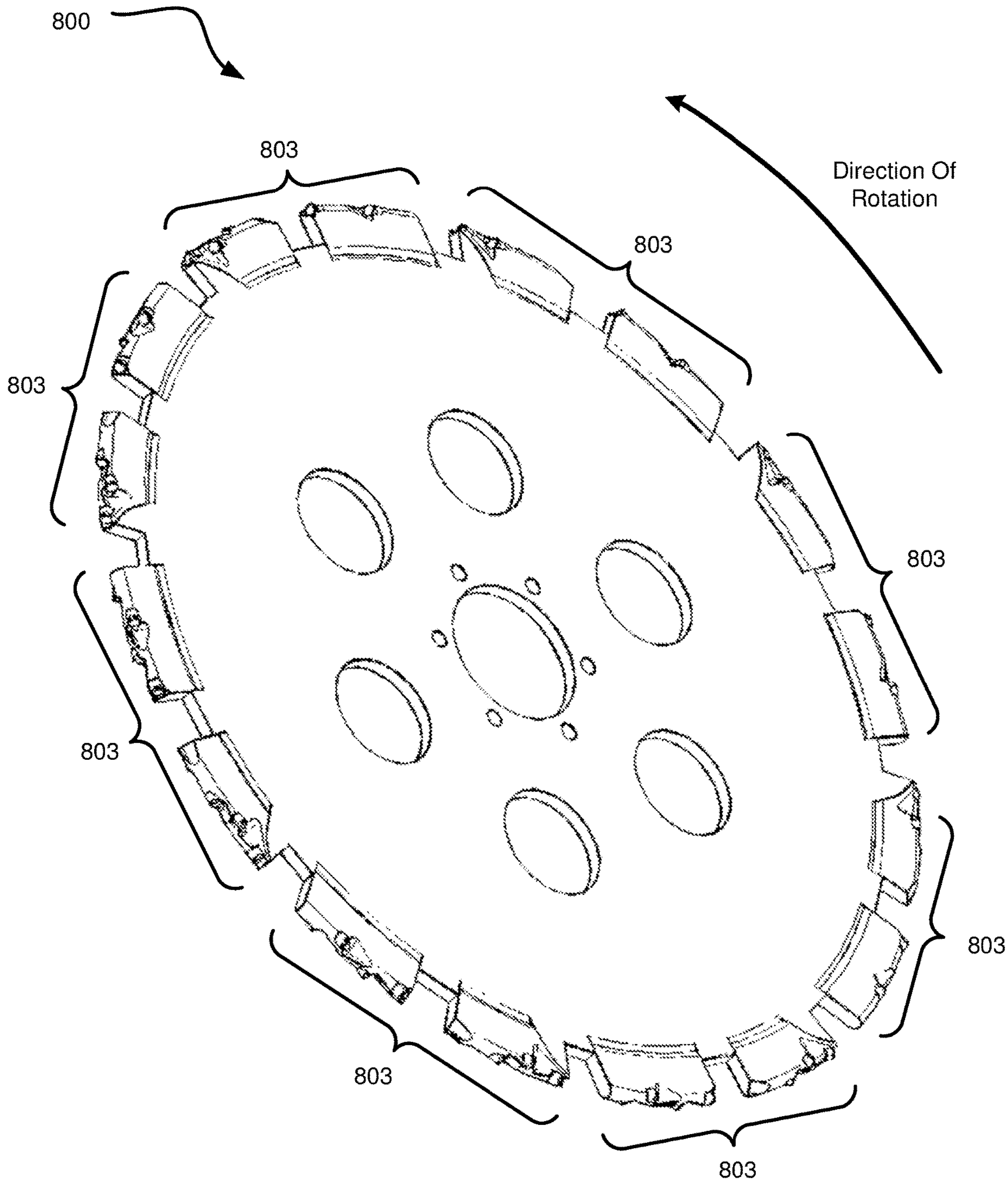
FIG. 9 is a perspective view of a blade with partitioned blade segments and a progressive cutter configuration.

FIG. 9 is a perspective view of the blade 800. The blade 800 includes the plurality of partitioned blade segments 801 running the periphery of the blade 800.

Figure 10:
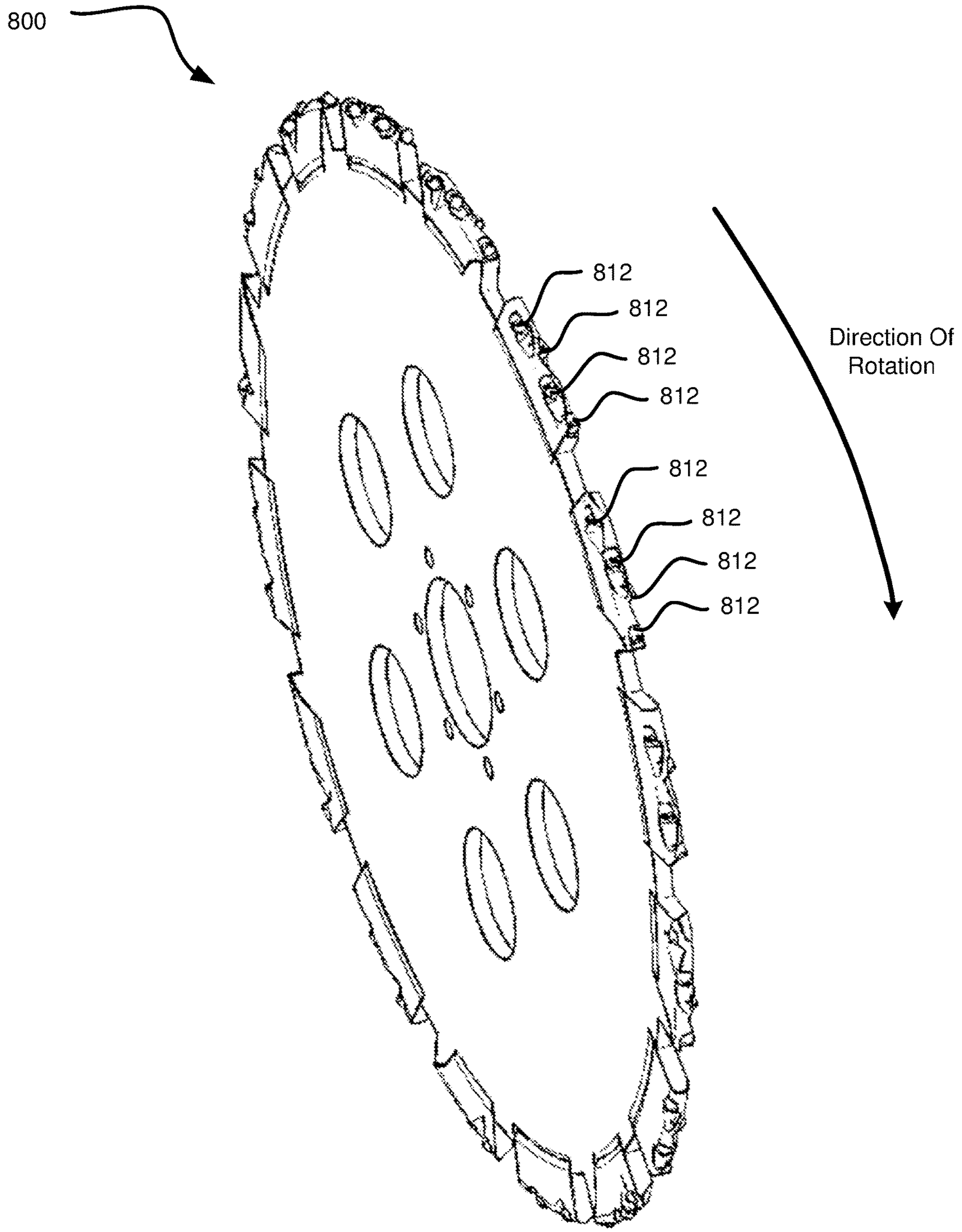
FIG. 10 is a perspective view of a blade with partitioned blade segments and a progressive cutter configuration.

FIG. 10 is a perspective view of the blade 800. The blade 800 includes a plurality of cutters 812, which may be similar to the cutters 112 described in connection with FIGS. 1-7. In an implementation, the blade 800 includes the same quantity of cutters 812 per blade segment 801 as the blade 100 illustrated in FIGS. 1-7. However, in the implementation illustrated in FIG. 10, the cutters 812 are partitioned across the leading blade segment 802 and the trailing blade segment 804.

Figure 11:
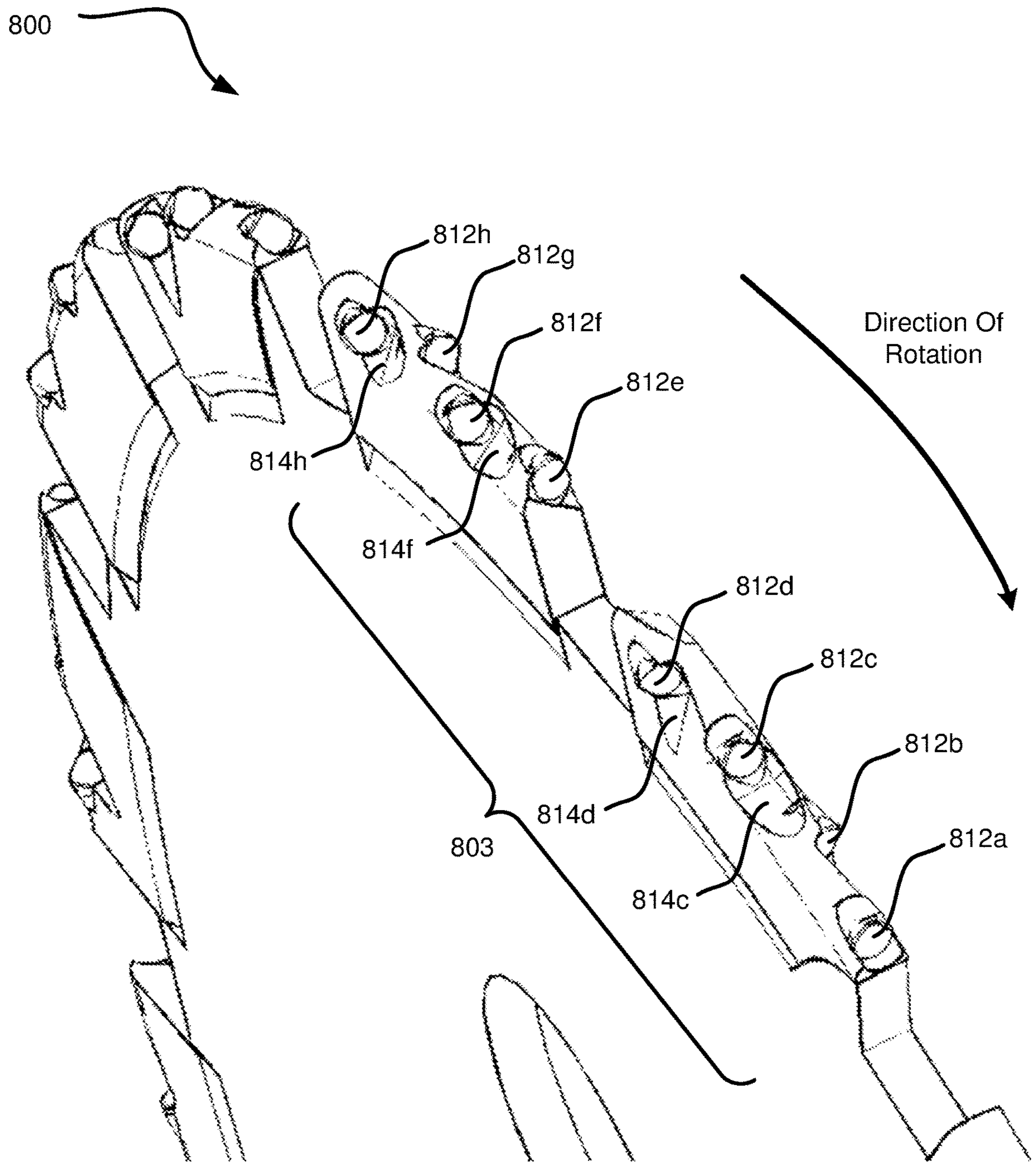
FIG. 11 is a perspective view of a portion of a blade with partitioned blade segments and a progressive cutter configuration.

FIG. 11 is a perspective view of a portion of the blade 800. The blade 800 includes a plurality of cutters 812 and a plurality of cutter trenches 814. The blade segment 801 illustrated in FIG. 11 includes eight cutters 812*a*, 812*b*, 812*c*, 812*d*, 812*e*, 812*f*, 812*g*, and 812*h*. The cutters 812 are equally partitioned across the leading blade segment 802 and the trailing blade segment 804. The blade segment 801 illustrated in FIG. 11 includes six cutter trenches 814*b*, 814*c*, 814*d*, 814*f*, 814*g*, 814*h*. The first cutter 812*a* does not have a corresponding cutter trench because the first cutter 812*a* is exposed at the edge of the leading blade segment 802. The fifth cutter 812*e* does not have a corresponding cutter trench because the fifth cutter 812*e* is exposed at the edge of the trailing blade segment 804.

The cutter trenches 814 are machined into the outside perimeter of the blade 800. The cutter trenches 814 provide a means to secure the cutters 812 to the blade 800. As discussed in connection with FIGS. 1-7, the cutters 812 are manufactured separately and independently of the blade 800 and then installed into the blade 800. The cutter trenches 814 provide a space for installing the cutters 812.

Figure 12:
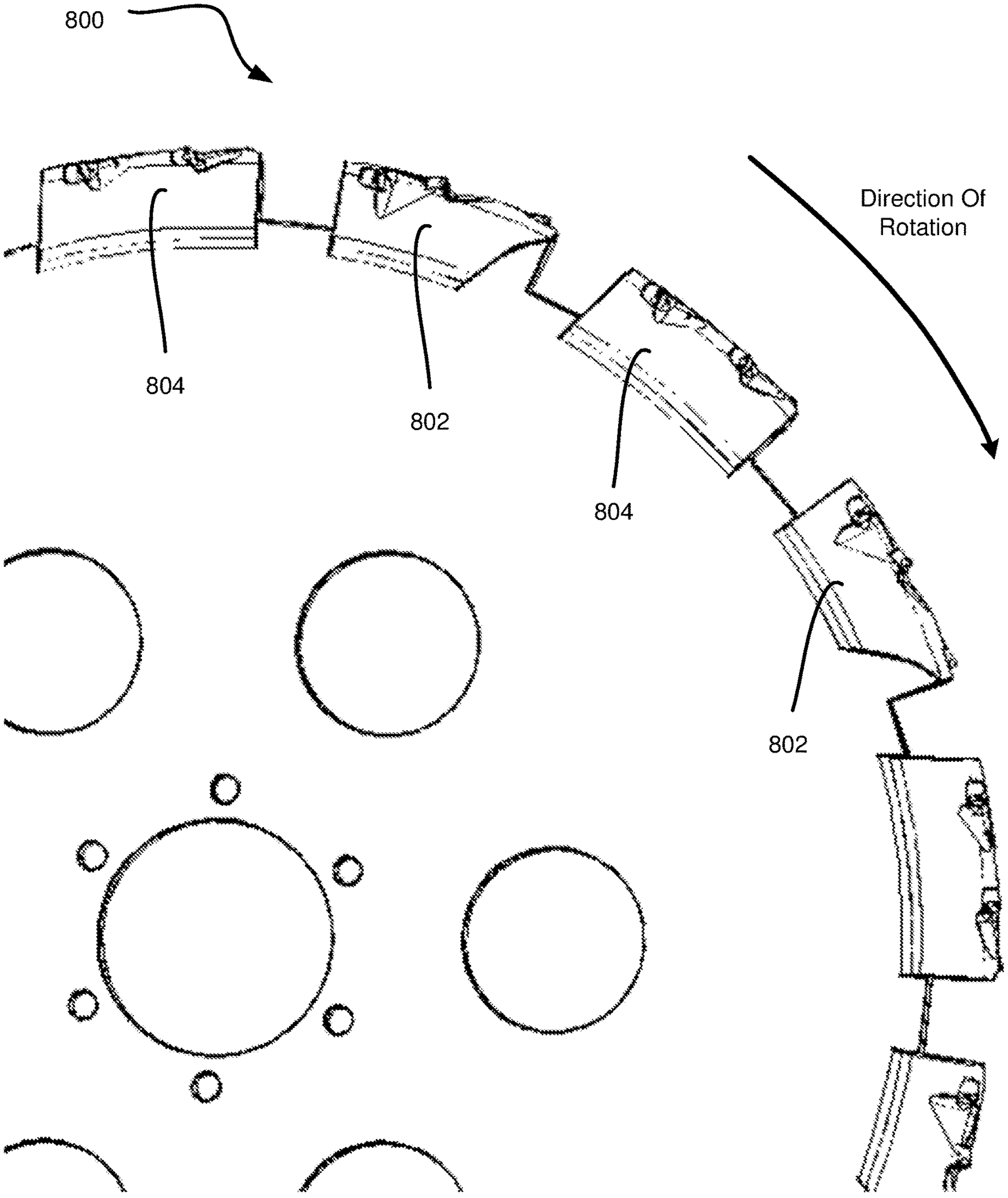
FIG. 12 is a primary straight-on view of a portion of a blade with partitioned blade segments and a progressive cutter configuration.

FIG. 12 is a primary straight-on view of a portion of the blade 800. The blade 800 is segmented into a plurality of groupings of blade segments. Each blade segment grouping includes a leading blade segment 802 and a trailing blade segment 804. The leading blade segment 802 is oriented in front of the trailing blade segment 804 in terms of the direction of rotation of the blade 800 during a trenching operation.

Figure 13:
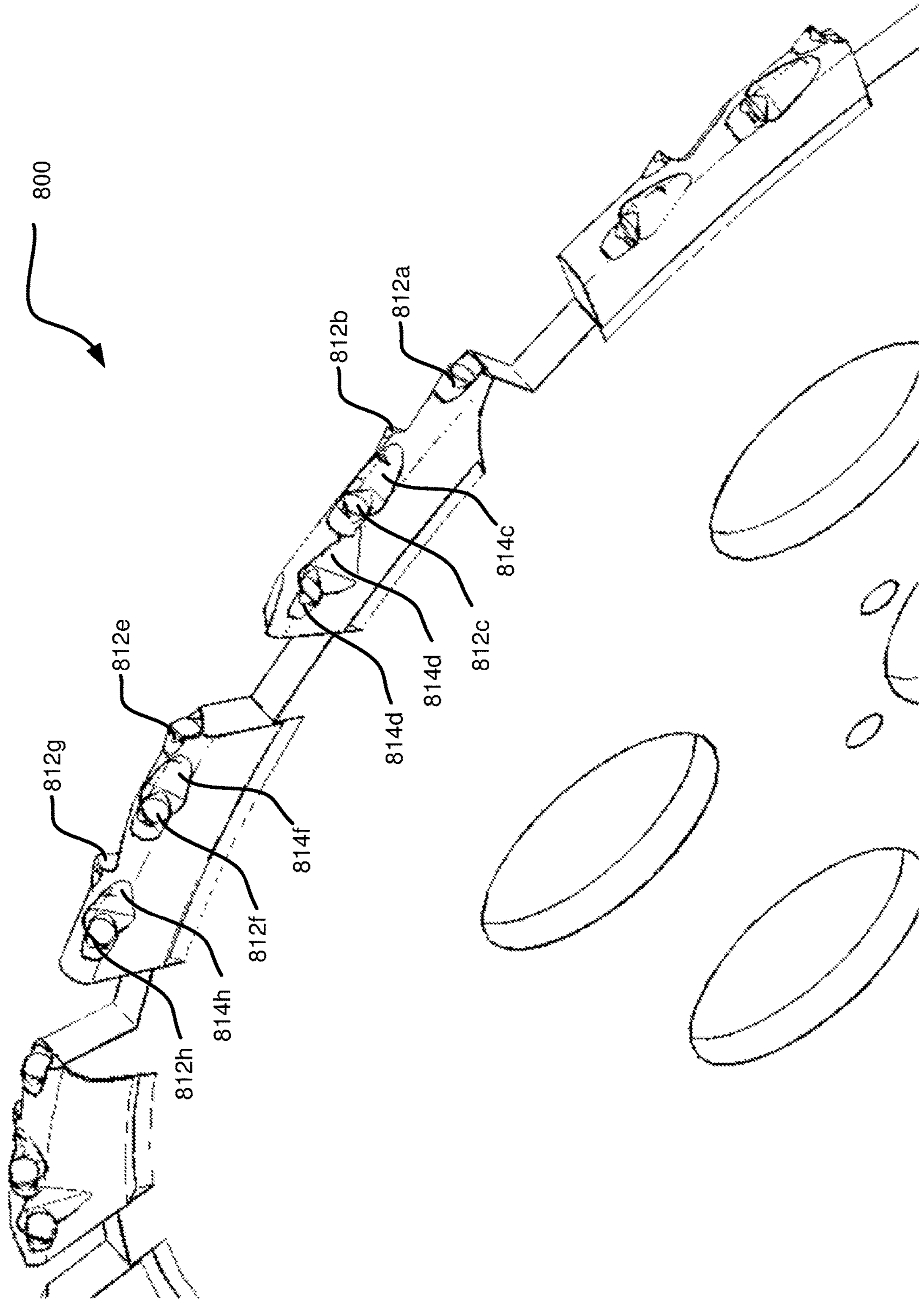
FIG. 13 is a perspective view of a portion of a blade with partitioned blade segments and a progressive cutter configuration.

FIG. 13 is a perspective view of a portion of the blade 800. The blade 800 is segmented into blade segments, and each blade segment includes a plurality of cutters 812 and cutter trenches 814. The cutters 812 are offset relative to one another along the cutting edge of the blade 800. The cutting edge of the blade 800 includes a width, and the width of the cutting edge is optimized and selected based on the implementation. For example, when the blade 800 is implemented for digging a microtrench for laying fiber optic cable, the width of the cutting edge of the blade may be one inch, 1.5 inches, or two inches depending on the preference.

Figure 14A:
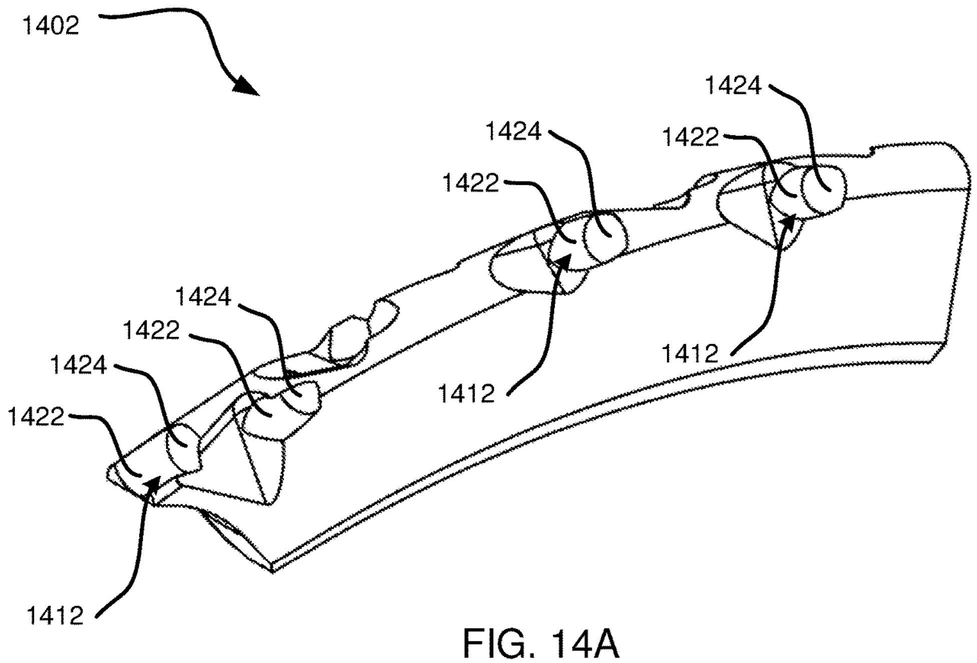
FIGS. 14A and 14B are perspective views of a portion of a partitioned blade segment comprising a progressive cutter configuration.
Figure 14B:
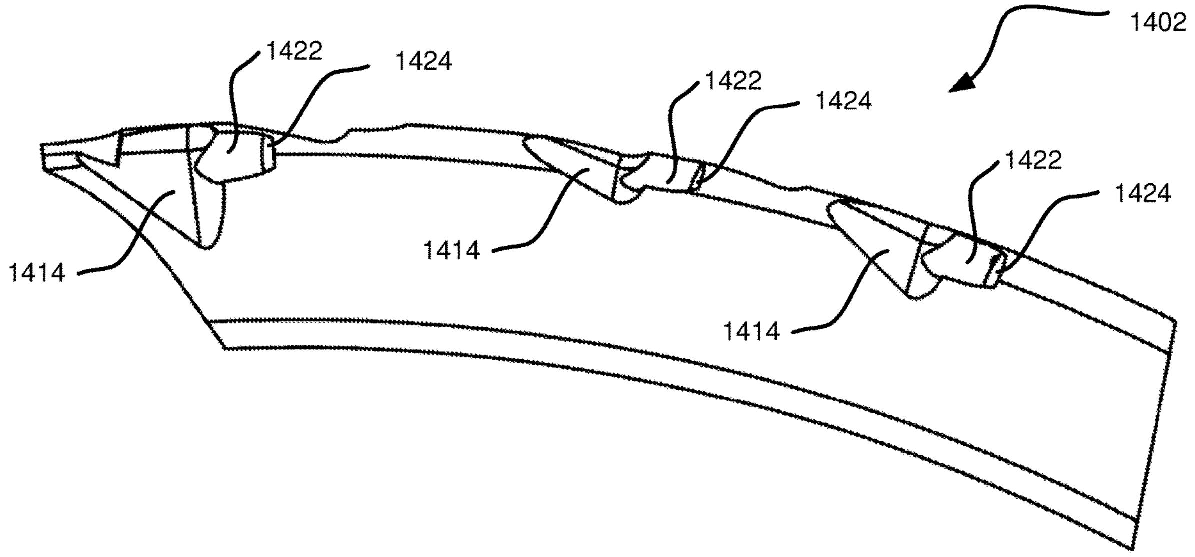
Figure 14C:
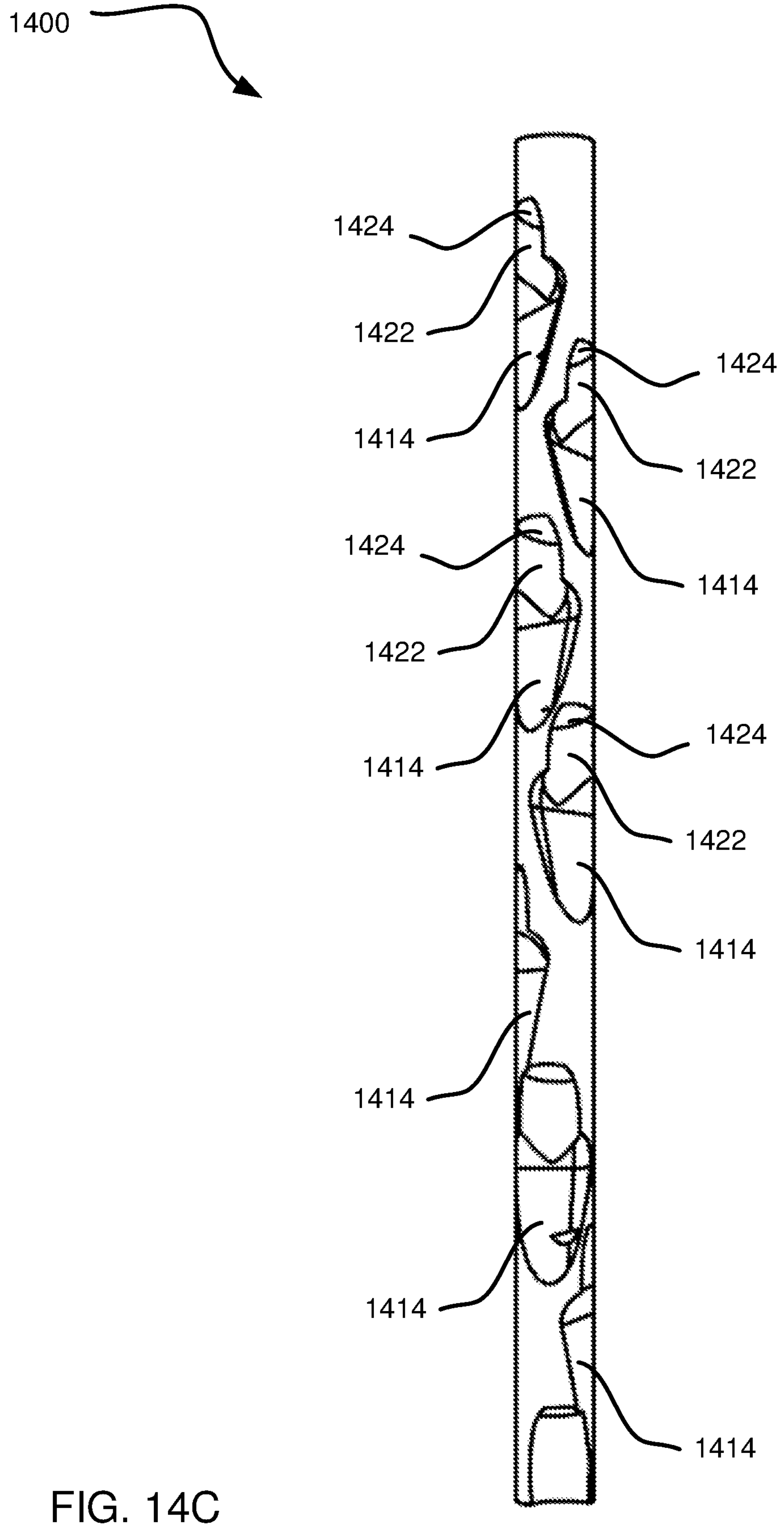
FIG. 14C is a primary straight-on view of a cutting edge of a partitioned blade segment comprising a progressive cutter configuration.

FIGS. 14A-14B illustrate perspective views of a blade segment 1402. FIG. 14C illustrates a primary straight-on view of a cutting edge of the blade 1400. The blade segments 1402 illustrated in FIGS. 14A and 14B may serve as the leading blade segment in the embodiments illustrated in FIGS. 8-13. The blade segment 1402 includes a plurality of cutters 1412 and a plurality of cutter trenches 1414. Each of the plurality of cutters 1412 includes a cylindrical body 1422 and a leading cutter edge 1424. The leading cutter edge 1424 shears material, such as rock, dirt, concrete, asphalt, and other materials, during operation. The leading cutter edge 1424 is constructed of a hard material such as diamond or carbide.

Figure 15:
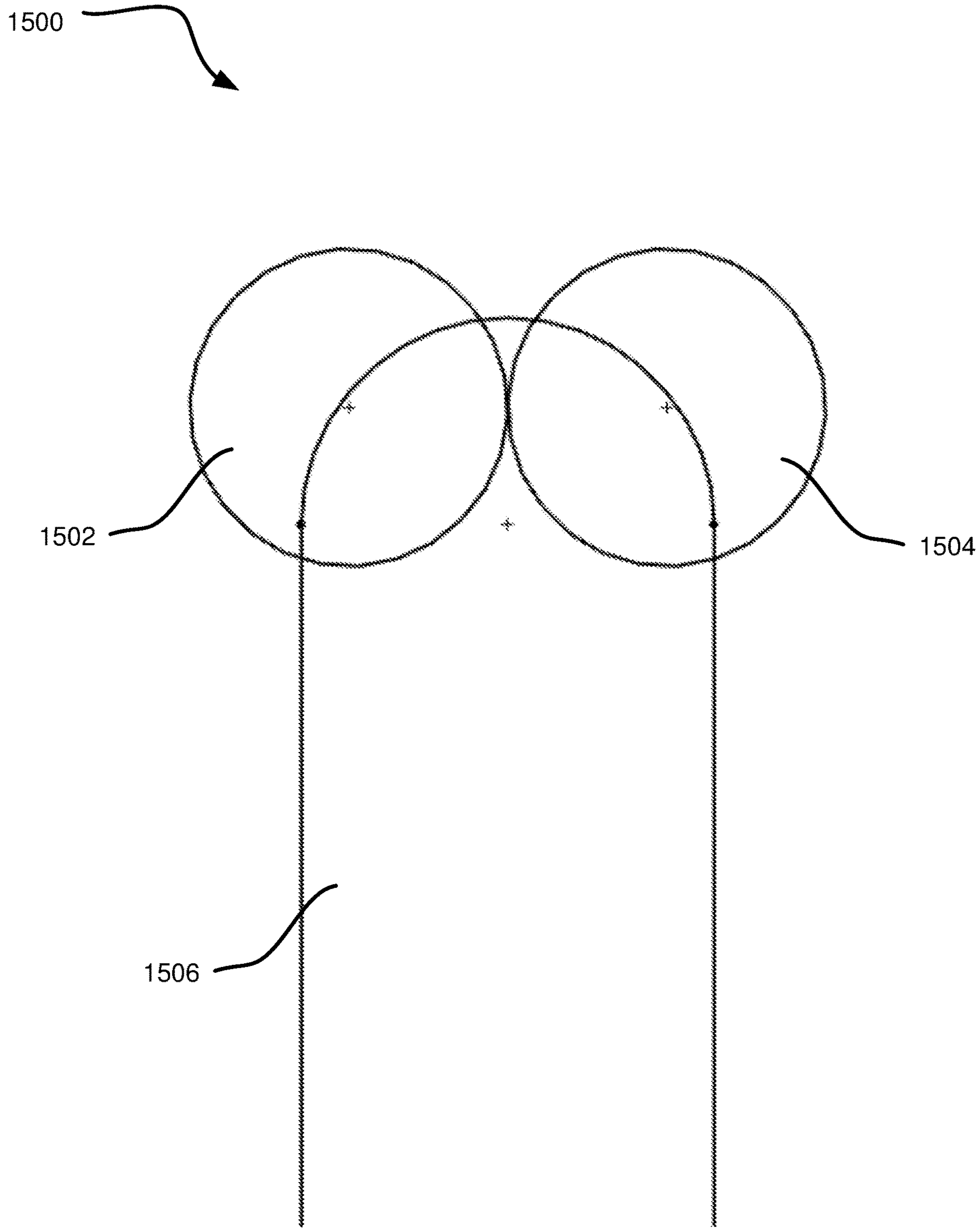
FIG. 15 PRIOR ART
FIG. 15 is a schematic illustration of a cutting profile of a traditional blade with side-by-side cutters.

FIG. 15 is a schematic diagram of a cutting profile 1500 for a microtrenching blade. The cutting profile 1500 illustrated in FIG. 15 is associated with traditional microtrenching blades known in the art. The cutting profile 1500 illustrates the orientations of the cutters 1502, 1504. In the traditional configuration illustrated in FIG. 15, a first cutter 1502 and a second cutter 1504 are attached to the blade 1506 side-by-side. In this implementation, the first cutter 1502 and the second cutter 1504 share the work of shearing rock, dirt, and other material during operation. The first cutter 1502 and the second cutter 1504 face head-on during operation and do not have any variation in orientation.

Figure 16:
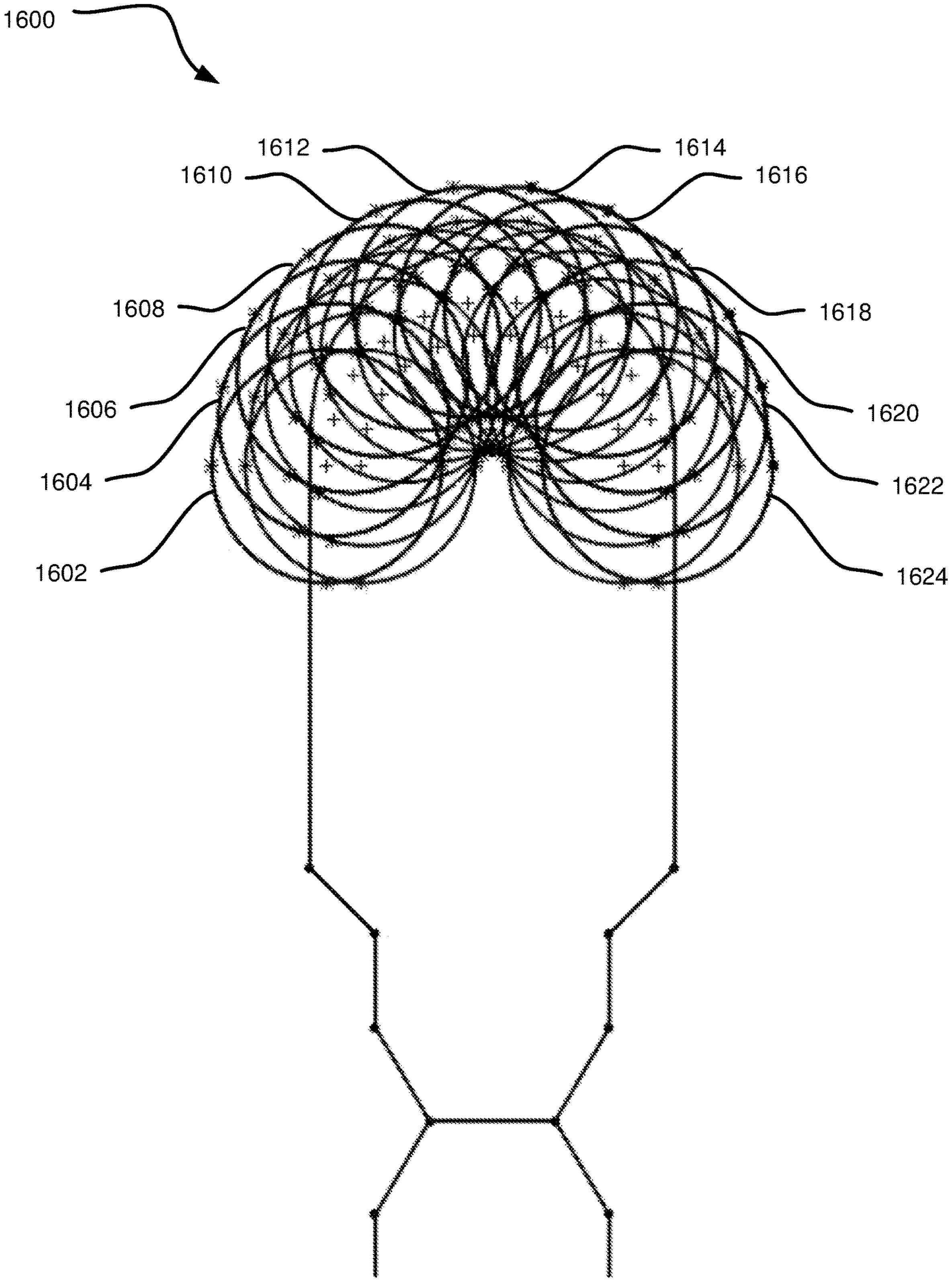
FIG. 16 is a schematic illustration of a cutting profile of a blade with a progressive cutter configuration.

FIG. 16 is a schematic diagram of a cutting profile 1600 for a microtrenching blade as described herein. The cutting profile 1600 includes twelve different cutting orientations 1602, 1604, 1606, 1608, 1610, 1612, 1614, 1616, 1618, 1620, 1622, and 1624. The cutting orientations 1602-1624 illustrated in FIG. 15 represent the angles of attack and offset locations of the cutters (see 112, 812) along the cutting edge of the blade. In the implementation illustrated in FIG. 16, twelve different cutters are oriented at varying angles and in offset locations within the width of the cutting edge of the blade. This ensures that each cutter performs an equal amount of work, or relatively equal amount of work, during operation. This increases the effectiveness and durability of the blade and the cutters.

Figure 17:
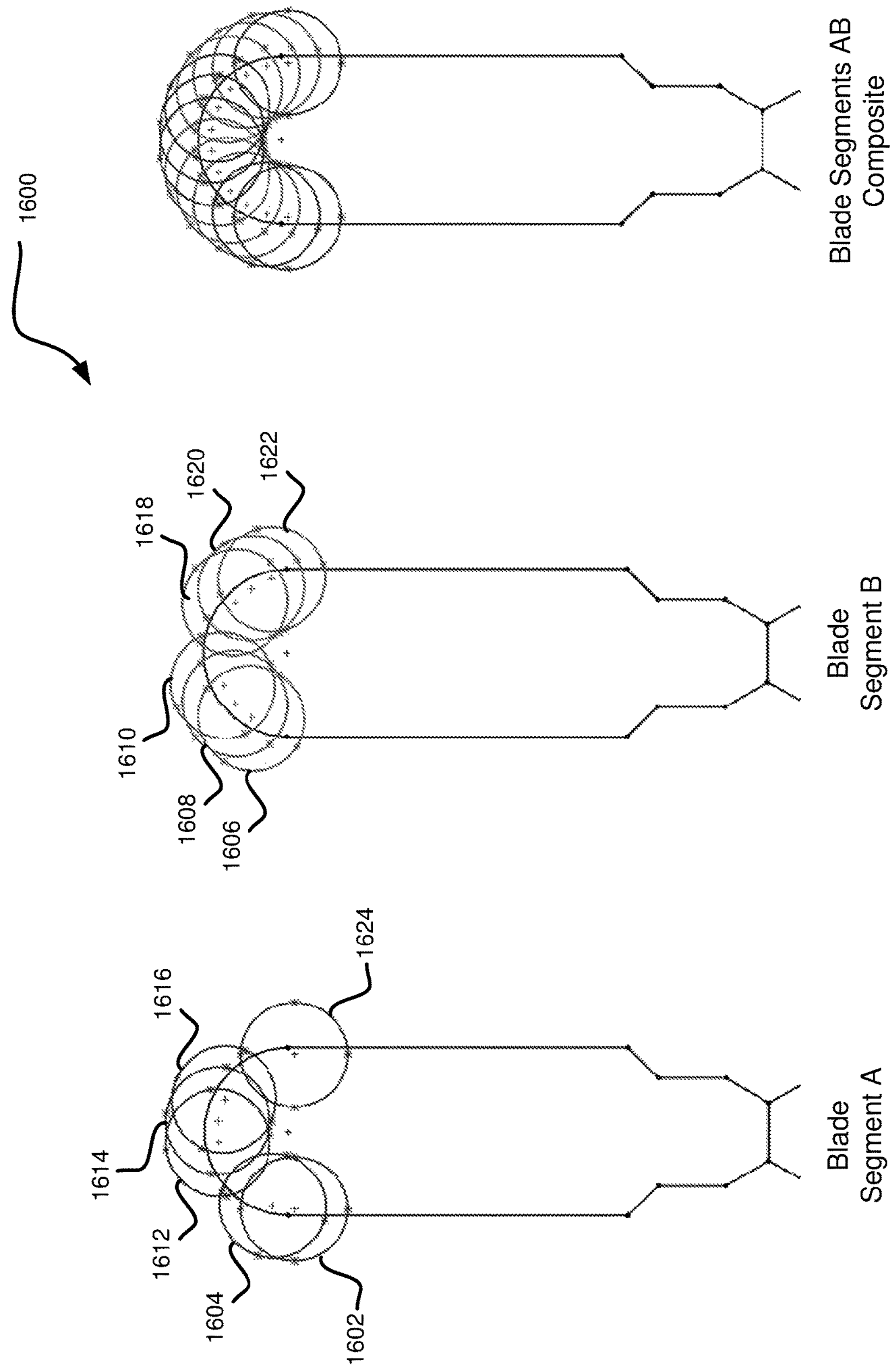
FIG. 17 is a schematic illustration of a cutting profile of a blade with a progressive cutter configuration, wherein the complete cutter profile is partitioned across multiple blade segments.

FIG. 17 is a schematic diagram of the cutting profile 1600 first illustrated in FIG. 16. FIG. 17 illustrates wherein the twelve different cutting profiles 1602-1624 are achieved across two separate blade segments, including Blade Segment A and Blade Segment B. The two blade segments create the composite Blade Segments AB cutting profile 1600. It should be appreciated that the cutting profiles 1602-1624 may be partitioned across any number of blade segments, and is not limited to two blade segments as illustrated in FIG. 17.

The cutting profiles 1602-1624 illustrate where the material (such as rock, concrete, dirt, asphalt, and so forth) is attacked and sheared during operation. The varying cutting profiles 1602-1624 enable the material to be sheared at different locations during operation. The varying cutting profiles 1602-1624 further ensure the cutters (see 112, 812) each perform a small portion of the work during operation. In the blades disclosed herein, a single blade segment may have numerous cutters, and may particularly have 6-12 cutters in a single blade segment. This is contrasted with the prior art cutting profile 1500 illustrated in FIG. 15, wherein a single blade segment only has two side-by-side cutters. The offset cutter orientations described herein increase the effectiveness and durability of the blade.

The alternated cutting profile 1600 provides significantly more impact resistance than a traditional side-by-side cutter orientation. The alternated cutting profile 1600 can be particularly valuable where there is light cobble or other material that could cause impact related damage to the cutter or the blade.

Figure 18A:
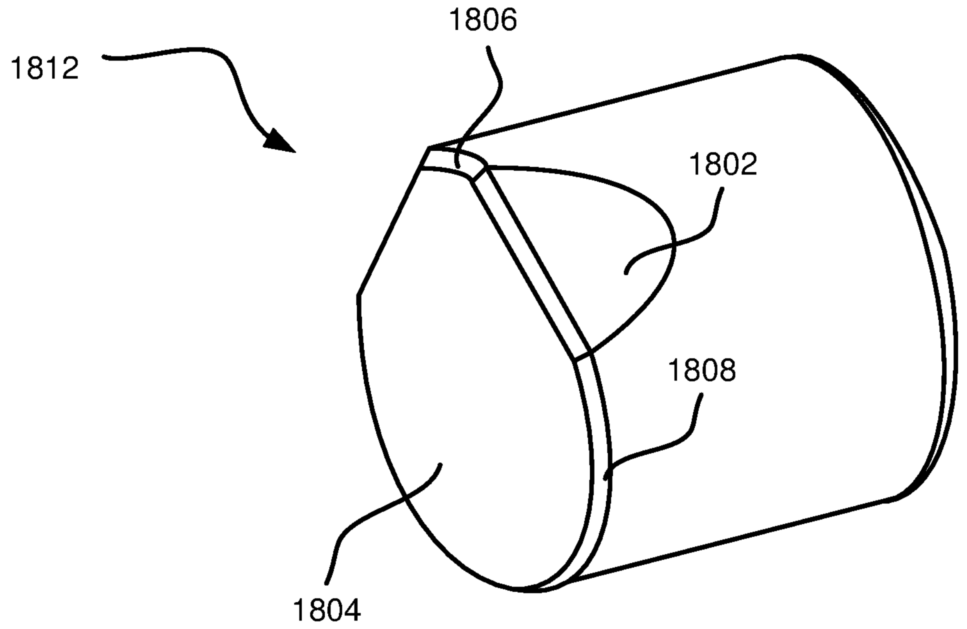
FIG. 18A is a perspective view of a cutter comprising a chamfer and a leading edge.
Figure 18B:
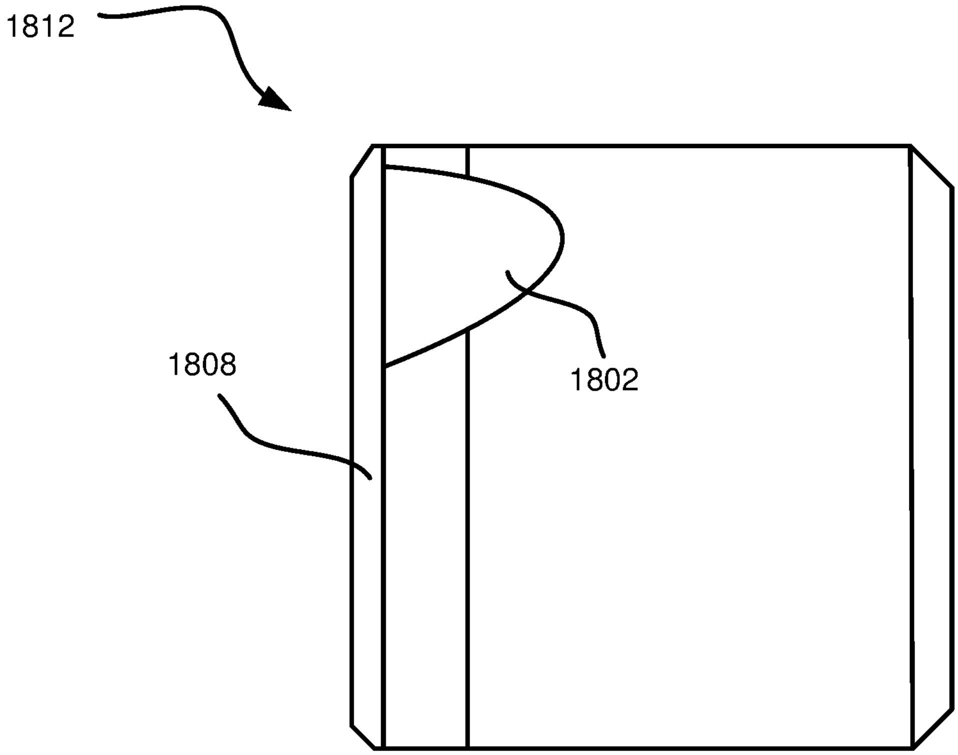
FIG. 18B is a primary straight-on view of a circumference of a cutter comprising a chamfer and a leading edge.
Figure 18C:
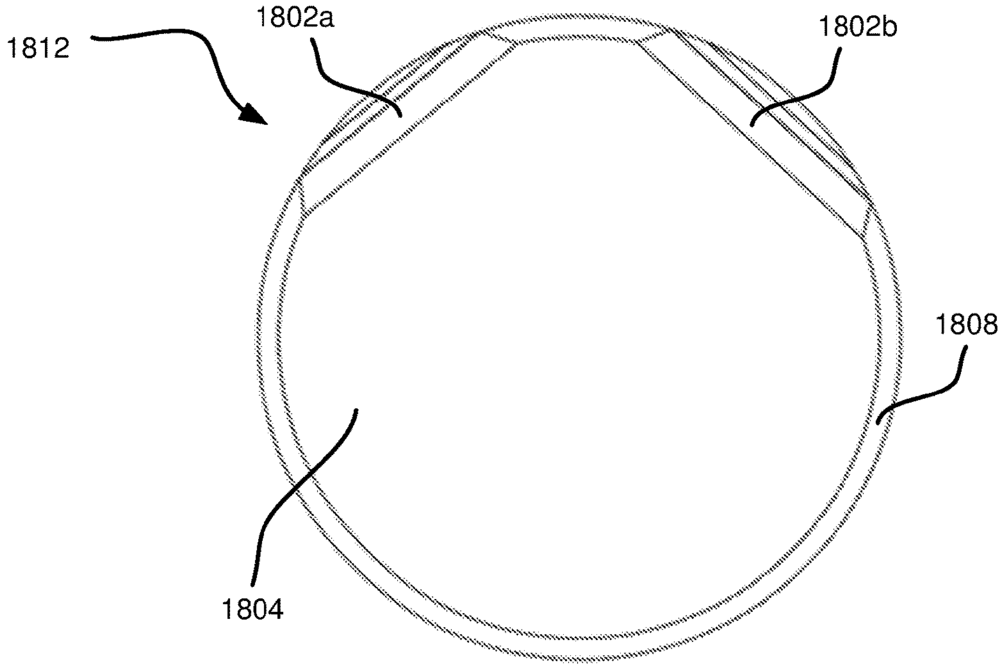
FIG. 18C is a primary straight-on view of a side of a cutter comprising a chamfer and a leading edge.

FIGS. 18A-18C illustrate schematic diagrams and visualizations of a cutter 1812 as described herein, including cutters 112, 812, 1412, 1812 described and illustrated herein. The cutter 1812 includes a chamfer 1802 and a leading side 1804. The leading side 1804 is disposed at the "front" end of the cutter 1812 with respect to the direction of rotation of the blade. The cutter 1812 includes a leading ridge 1808 and a shearing point 1806. The cutter 1812 may include a plurality of chamfers, such as a first chamfer 1802*a* and a second chamfer 1802*b*.

The cutter 1812 may be designed with varying chamfer lengths. In various implementations, the cutter 1812 may include a 0.015 inch chamfer or a 0.020 inch chamfer. The chamfer 1802 may have any suitable dimensions as determined based on the implementation and may specifically have a chamfer with a length ranging anywhere from 0.010 inches to 0.030 inches. In some implementations, and with some formations, the length of the chamfer 1802 of the cutter 1812 directly impacts the rate of penetration for the blade and the durability of the cutter and the blade.

FIG. 19 is a schematic diagram illustrating a cutter 1912 secured to a blade 1902. In the illustration depicted in FIG. 19, the blade 1902 is engaged in a microtrenching operation on a formation 1936. The formation 1936 may include, for example, concrete, asphalt, rock, dirt, and other materials. The cutter 1912 is attached to the blade 1902 at a back rake angle 1934. The cutter 1912 shears the formation 1936 and causes platelets 1938 to curl off and be released from the formation 1936.

The back rake angle 1934 of the cutter 1912 is measured as shown in FIG. 19, wherein a first axis is defined perpendicular to the edge of the blade 1902 at that point. The second axis is defined parallel and along the leading edge 1804 of the cutter 1912.

The cutters described herein may be implemented as a plowing cutter. The plowing cutter fails rock using a plowing action that maximizes the rate of penetration in soft to medium-soft formations. The plowing cutter design requires less torque than a standard round cutter. The plowing cutter can yield performance improvements for a microtrenching application by increasing the rate of penetration and decreasing the power requirements to turn the blade.

EXAMPLES

The following examples pertain to further embodiments.

Example 1 is a blade. The blade includes a blade body comprising a cutting edge, wherein the cutting edge is disposed around a perimeter of the blade body, and wherein the cutting edge comprises a centerline and a width. The blade includes a plurality of cutters attached to the cutting edge. The blade is such that three or more of the plurality of cutters are each attached to the cutting edge of the blade body at a different position relative to the centerline of the cutting edge of the blade body.

Example 2 is a blade as in Example 1, wherein the cutting edge comprises a first side and a second side, and wherein the second side is located on an opposite side of the centerline relative to the first side, and wherein: a first cutter of the plurality of cutters is located on the first side of the cutting edge; and a second cutter of the plurality of cutters is located on the second side of the cutting edge.

Example 3 is a blade as in any of Examples 1-2, further comprising a center arbor bore, wherein the blade rotates about an axis of rotation that is perpendicular to the center arbor bore, and wherein the first cutter is a leading cutter relative to the second cutter when the blade is rotated about the axis of rotation.

Example 4 is a blade as in any of Examples 1-3, wherein a position of each of the plurality of cutters across the width of the cutting edge is alternated such that neighboring cutters are located on opposite sides of the width of the cutting edge relative to the centerline.

Example 5 is a blade as in any of Examples 1-4, further comprising a cutting profile defining where a leading edge of each of the plurality of cutters is located relative to the centerline of the cutting edge, and wherein the plurality of cutters are attached to the cutting edge at different locations across the width of the cutting edge such that the cutting profile comprises eight or more different positions for the leading edge of a cutter relative to the centerline of the cutting edge.

Example 6 is a blade as in any of Examples 1-5, wherein the blade is a microtrenching blade, and wherein the plurality of cutters are configured for shearing a material during operation.

Example 7 is a blade as in any of Examples 1-6, wherein the plurality of cutters are attached to the cutting edge at different locations across the width of the cutting edge relative to the centerline of the cutting edge such that each of the plurality of cutters performs the same work when shearing material during operation of the blade.

Example 8 is a blade as in any of Examples 1-7, wherein each of the plurality of cutters is attached to the cutting edge at a back rake angle, and wherein the back rake angle is defined by a first axis that is perpendicular to the cutting edge at a center point of the cutter and is further defined by a second axis that is parallel to a leading edge of the cutter.

Example 9 is a blade as in any of Examples 1-8, wherein the back rake angle of any of the plurality of cutters is from zero degrees to twenty degrees.

Example 10 is a blade as in any of Examples 1-9, wherein the back rake angle of any of the plurality of cutters is from five degrees to fifteen degrees.

Example 11 is a blade as in any of Examples 1-10, wherein the blade comprises two or more cutters attached to the cutting edge at different back rake angles.

Example 12 is a blade as in any of Examples 1-11, wherein each of the plurality of cutters comprises a leading edge configured for shearing a material during operation, wherein the material comprises one or more of dirt, rock, asphalt, or concrete.

Example 13 is a blade as in any of Examples 1-12, wherein each of the plurality of cutters comprises two or more chamfers and a shearing point, and wherein a dimension of the two or more chamfers is optimized for shearing a material during operation.

Example 14 is a blade as in any of Examples 1-13, wherein the plurality of cutters is removably attached to the blade such that each of the plurality of cutters is interchangeable.

Example 15 is a blade as in any of Examples 1-14, wherein the blade body is constructed of steel.

Example 16 is a blade as in any of Examples 1-15, wherein the plurality of cutters are constructed of one or more of polycrystalline diamond compact (PDC) or carbide.

Example 17 is a blade as in any of Examples 1-16, wherein the cutting edge of the blade is separated into a plurality of blade segments, and wherein each of the plurality of blade segments comprises four or more of the plurality of cutters.

Example 18 is a blade as in any of Examples 1-17, further comprising a plurality of cutter trenches cut into the cutting edge of the blade, wherein each of the plurality of cutter trenches comprises a leading edge and a trailing edge relative to rotation of the blade during operation, and wherein one or more of the plurality of cutters is attached to the cutting edge of the blade at a trailing edge of a cutter trench.

Example 19 is a blade as in any of Examples 1-18, wherein each of the plurality of blade segments comprises a leading edge and a trailing edge relative to the rotation of the blade during operation, and wherein a leading cutter attached to a blade segment does not comprise a corresponding cutter trench.

Example 20 is a blade as in any of Examples 1-19, wherein the blade body is constructed of steel and the plurality of cutters are constructed of polycrystalline diamond compact (PCT) or carbide, and wherein the plurality of cutters are manufactured separately and independently of the blade body.

Example 21 is a blade. The blade includes a blade body comprising a cutting edge, wherein the cutting edge is disposed around a perimeter of the blade body. The blade includes a center arbor bore defining a hole through the blade body, wherein the blade rotates about an axis of rotation perpendicular to the center arbor bore. The blade includes a plurality of cutters attached to the cutting edge, wherein each of the plurality of cutters comprises a hardness value equal to or exceeding a hardness of polycrystalline diamond compact. The blade is such that the cutting edge is separated into a plurality of blade segments. The blade is such that each of the plurality of blade segments comprises two or more of the plurality of cutters.

Example 22 is a blade as in Example 21, wherein each of the plurality of blade segments comprises a leading blade segment and a trailing blade segment relative to the rotation of the blade about the axis of rotation, and wherein the leading blade segment is separate from the trailing blade segment.

Example 23 is a blade as in any of Examples 21-22, wherein the leading blade segment comprises four or more of the plurality of cutters and the trailing blade segment comprises four or more of the plurality of cutters.

Example 24 is a blade as in any of Examples 21-23, wherein: the four or more cutters on the leading blade segment are attached to the cutting edge at different positions across a width of the cutting edge relative to a centerline of the cutting edge; and the four or more cutters on the trailing blade segment are attached to the cutting edge at different positions across the width of the cutting edge relative to the centerline of the cutting edge.

Example 25 is a blade as in any of Examples 21-24, wherein the blade segment comprises a cutting profile that defines where a leading edge of each of the plurality of cutters on the blade segment is located relative to the centerline of the cutting edge, and wherein the cutting profile for the blade segment comprises a plurality of unique cutter positions such that each of the four or more cutters on the leading blade and each of the four or more cutters on the trailing blade is attached to the cutting edge at a different position across the width of the cutting edge relative to the centerline of the cutting edge.

Example 26 is a blade as in any of Examples 21-25, wherein each of the plurality of cutters comprises a leading edge, wherein the leading edge comprises a back rake angle relative to the cutting edge of the blade, and wherein each of the plurality of cutters is configured to shear a formation during operation.

Example 27 is a blade as in any of Examples 21-26, wherein one blade segment of the plurality of blade segments comprises four or more cutters of the plurality of cutters, and wherein the four or more cutters are attached to the cutting edge such that: two or more cutters comprise a different back rake angle; and two or more cutters are attached to the cutting edge at a different position across a width of the cutting relative to a centerline of the cutting edge.

Example 28 is a blade as in any of Examples 21-27, wherein the blade is a microtrenching blade comprising a circular shape, and wherein a diameter of the circular shape is optimized for digging a trench from 10 inches deep to two feet deep.

Example 29 is a blade as in any of Examples 21-28, wherein the blade comprises a first portion and a second portion, and wherein the center arbor bore is disposed within the first portion, and wherein the second portion is attached to the first portion and comprises the cutting edge of the blade, and wherein a width of the cutting edge is greater than a thickness of the first portion.

Example 30 is a blade as in any of Examples 21-29, wherein each of the plurality of blade segments comprises a leading blade segment and a trailing blade segment, and wherein the leading blade segment comprises an angled blade cap that comprises a leading edge, and wherein the leading edge of the angled blade cap comprises an angle that is not parallel to a radial line of the blade.

Example 31 is a blade as in any of Examples 21-30, wherein the trailing blade segment comprises a blunt blade cap, and wherein a leading edge of the blunt blade cap comprises an angle that is parallel to the radial line of the blade.

Example 32 is a blade as in any of Examples 21-31, wherein the blade body is constructed of steel.

Example 33 is a blade as in any of Examples 21-32, wherein the plurality of cutters are constructed of one or more of steel or polycrystalline diamond compact.

Example 34 is a blade as in any of Examples 21-33, wherein each of the plurality of blade segments comprises a leading blade segment and a trailing blade segment relative to the rotation of the blade about the axis of rotation, and wherein the leading blade segment comprises a leaning edge, wherein the leaning edge is non-perpendicular relative to the perimeter of the blade body.

Example 35 is a blade as in any of Examples 21-34, wherein the trailing blade segment comprises a squared edge, wherein the squared edge is normal or nearly normal to the perimeter of the blade body.

Example 36 is a blade as in any of Examples 21-35, wherein each of the plurality of blade segments is partitioned into a blade segment pair comprising a leading blade segment and a trailing blade segment, and wherein the blade comprises a plurality of blade segment pairs disposed about the perimeter of the blade body.

Example 37 is a blade as in any of Examples 21-36, wherein the plurality of blade segment pairs are arranged such that the blade comprises a plurality of leading blade segments and a plurality of trailing blade segments, and wherein each of the plurality of leading blade segments is alternated with the plurality of trailing blade segments such that a leading blade segment is next to a trailing blade segment.

Example 38 is a blade as in any of Examples 21-37, wherein the blade is optimized for excavating in wet conditions.

Example 39 is a blade as in any of Examples 21-38, further comprising a plurality of periphery bores each defining a hole through the blade body, wherein the plurality of periphery bores reduce an overall mass of the blade.

Example 40 is a blade as in any of Examples 21-39, wherein the blade body comprises a first portion and a second portion, and wherein the first portion comprises the center arbore bore, and wherein the second portion comprises the cutting edge, and wherein the first portion is manufactured separately from the second portion.

Example 41 is a blade. The blade includes a first blade portion comprising a center arbor bore defining a hole through the blade. The blade includes a second blade portion comprising a plurality of blade segments, wherein the second blade portion is distal to the first blade portion relative to the center arbor bore. The blade includes a plurality of blade scoops disposed around a perimeter of the blade. The blade is such that the plurality of blade segments and the plurality of blade scoops are arranged such that two of the plurality of blade segments are separated by a blade scoop.

Example 42 is a blade as in Example 41, wherein the second blade portion further comprises a cutting edge defined around the perimeter of the blade, and wherein the blade further comprises a plurality of cutters attached to the cutting edge.

Example 43 is a blade as in any of Examples 41-42, wherein the first blade portion is manufactured independently of the second blade portion.

Example 44 is a blade as in any of Examples 41-43, wherein the first blade portion and the second blade portion are manufactured together as a single metal element.

Example 45 is a blade as in any of Examples 41-44, wherein the blade is a microtrenching blade for excavating a substrate to generate a microtrench, and wherein the plurality of scoops are configured for conveying the substrate during operation.

Example 46 is a blade as in any of Examples 41-45, wherein the plurality of blade segments are independently attached to an outer perimeter of the first blade portion, and wherein the plurality of blade scoops are disposed between each of the plurality of independent blade segments.

Example 47 is a blade as in any of Examples 41-46, wherein the plurality of scoops are defined by a combination of the first blade portion and the second blade portion such that each of the plurality of blade scoops is cut into an outer perimeter of the first blade portion.

Example 48 is a blade as in any of Examples 41-47, wherein the plurality of blade scoops each comprise a depth measured from the perimeter of the blade to an interior-most portion of a blade scoop, wherein the interior-most portion of the blade scoop is located nearest the center arbore bore of the blade.

Example 49 is a blade as in any of Examples 41-48, wherein the depth of each of the plurality of blade scoops is defined by a combination of the first blade portion and the second blade portion, and wherein: a portion of the depth of the plurality of blade scoops is defined by separation between the plurality of blade segments, wherein each of the plurality of blade segments is independently attached to the first blade portion; and a portion of the depth of the plurality of blade scoops is defined by an outer perimeter of the first blade portion, wherein the plurality of blade scoops are cut into the outer perimeter of the first blade portion.

Example 50 is a blade as in any of Examples 41-49, wherein the portion of the depth of the plurality of blade scoops that is cut into the outer perimeter of the first blade portion comprises from about 30% to about 50% the total depth of each the plurality of blade scoops.

Example 51 is a blade as in any of Examples 41-50, wherein the portion of the depth of the plurality of blade scoops that is defined by the separation between the plurality of blade segments of the second blade portion comprises from about 50% to about 70% the total depth of each of the plurality of blade scoops.

Example 52 is a blade as in any of Examples 41-51, wherein the plurality of blade scoops comprise varying depths such that two or more of the plurality of blade scoops comprise a different depth.

Example 53 is a blade as in any of Examples 41-52, further comprising a blade diameter, and wherein the depth of at least a portion of the plurality of blade scoops comprises from about 10% to about 20% the blade diameter.

Example 54 is a blade as in any of Examples 41-53, further comprising a blade diameter, and wherein the depth of at least a portion of the plurality of blade scoops comprises from about 15% to about 25% the blade diameter.

Example 55 is a blade as in any of Examples 41-54, wherein the depth of at least a portion of the plurality of blade scoops is greater than or equal to 1.5 inches.

Example 56 is a blade as in any of Examples 41-55, wherein the plurality of blade scoops are configured for collecting and excavating one or more of dirt, mud, rocks, concrete, or asphalt during a microtrenching operation.

Example 57 is a blade as in any of Examples 41-56, wherein at least a portion of the plurality of blade scoops are cut into an outer perimeter of the first blade portion at an angle that is offset from a radial line, wherein the radial line extends from the center arbore bore to the perimeter of the blade.

Example 58 is a blade as in any of Examples 41-57, wherein the angle that is offset from the radial line is optimized for maximizing a quantity of substrate that is collected and excavated by the plurality of scoops during a microtrenching operation.

Example 59 is a blade as in any of Examples 41-58, wherein the plurality of blade segments define a cutting edge of the blade, and wherein the blade further comprises one or more cutters attached to the plurality of blade segments.

Example 60 is a blade as in any of Examples 41-59, wherein each of the plurality of blade scoops is an indentation cut into the perimeter of the blade such that the plurality of blade scoops are defined by an absence of material.

Example 61 is a blade as in any of Examples 1-60, wherein the blade is a microtrenching blade.

Example 62 is a blade as in any of Examples 1-61, wherein the blade is a microtrenching blade comprising a width that is less than or equal to six inches.

Example 62 is a blade as in any of Examples 1-62, wherein the blade is a microtrenching blade comprising a width that is less than or equal to five inches.

Example 63 is a blade as in any of Examples 1-62, wherein the blade is a microtrenching blade configured for excavating a formation that is sufficiently wide and deep for laying a cable.

Example 64 is a blade as in any of Examples 1-63, wherein the plurality of cutters are constructed of polycrystalline diamond compact.

Example 65 is a blade as in any of Examples 1-64, wherein the plurality of cutters are constructed of tungsten carbide.

Example 66 is a blade as in any of Examples 1-65, wherein the plurality of cutters are constructed of a material comprising a hardness that is greater than or equal to a hardness of polycrystalline diamond compact.

Example 67 is a blade as in any of Examples 1-66, wherein the plurality of cutters are constructed of a material comprising a hardness value equal to or exceeding 40 gigapascals.

Example 68 is a blade as in any of Examples 1-67, wherein the plurality of cutters are constructed of a material comprising a hardness value equal to or exceeding 60 gigapascals.

It is to be understood that any features of the above-described arrangements, examples, and embodiments may be combined in a single embodiment comprising a combination of features taken from any of the disclosed arrangements, examples, and embodiments.

In the foregoing Detailed Description of the Disclosure, various features of the disclosure are grouped together in a single embodiment for the purpose of streamlining the disclosure. This method of disclosure is not to be interpreted as reflecting an intention that the claimed disclosure requires more features than are expressly recited in each claim. Rather, inventive aspects lie in less than all features of a single foregoing disclosed embodiment.

It is to be understood that the above-described arrangements are only illustrative of the application of the principles of the disclosure. Numerous modifications and alternative arrangements may be devised by those skilled in the art without departing from the spirit and scope of the disclosure and the appended claims are intended to cover such modifications and arrangements.

Thus, while the disclosure has been shown in the drawings and described above with particularity and detail, it will be apparent to those of ordinary skill in the art that numerous modifications, including, but not limited to, variations in size, materials, shape, form, function and manner of operation, assembly and use may be made without departing from the principles and concepts set forth herein.

The foregoing description has been presented for the purposes of illustration and description. It is not intended to be exhaustive or to limit the disclosure to the precise form disclosed. Many modifications and variations are possible in light of the above teaching. Further, it should be noted that any or all the aforementioned alternate implementations may be used in any combination desired to form additional hybrid implementations of the disclosure.

Further, although specific implementations of the disclosure have been described and illustrated, the disclosure is not to be limited to the specific forms or arrangements of parts so described and illustrated. The scope of the disclosure is to be defined by the claims appended hereto, any future claims submitted here and in different applications, and their equivalents.

What is claimed is:

1. A blade comprising:

a first blade portion comprising a center arbor bore defining a hole through the blade;

a second blade portion comprising a plurality of blade segments, wherein the second blade portion is distal to the first blade portion relative to the center arbor bore, the plurality of blade segments forming a cutting edge; and a plurality of blade scoops disposed around a perimeter of the blade, wherein each of the plurality of blade scoops is defined by a sidewall and comprises a width;

wherein the plurality of blade segments and the plurality of blade scoops are arranged such that two of the plurality of blade segments are separated by a blade scoop;

wherein the second blade portion further comprises a cutting edge defined around the perimeter of the blade, and wherein the plurality of blade segments further comprises a plurality of cutters attached to the cutting edge;

wherein the cutting edge comprises a width and a centerline;

wherein three or more of the plurality of blade segments are each attached to the cutting edge of the blade body at a different position across the width and at a different position relative to the centerline of the cutting edge of the blade body;

wherein the width of the blade scoop tapers from the first blade portion to the second blade portion; and wherein a first portion of each of the plurality of blade scoops is a leading edge and is located opposite a second portion of each of the plurality of blade scoops, and the second portion is a thicker width than the first portion and forms a scoop sleeve.

2. The blade of claim 1, wherein each of the plurality of blade segments are spaced apart such that the cutting edge is non-continuous around the perimeter of the blade body.

3. The blade of claim 1, wherein the first blade portion is manufactured independently of the second blade portion.

4. The blade of claim 1, wherein the first blade portion and the second blade portion are manufactured together as a single metal element.

5. The blade of claim 1, wherein the blade is a microtrenching blade for excavating a substrate to generate a microtrench, and wherein the plurality of scoops are configured for conveying the substrate during operation.

6. The blade of claim 1, wherein the plurality of blade segments are independently attached to an outer perimeter of the first blade portion, and wherein the plurality of blade scoops are disposed between each of the plurality of independent blade segments.

7. The blade of claim 1, wherein the plurality of scoops are defined by a combination of the first blade portion and the second blade portion such that each of the plurality of blade scoops is cut into an outer perimeter of the first blade portion.

8. The blade of claim 1, wherein the plurality of blade scoops each comprises a depth, wherein the depth comprises a first depth and a second depth;

wherein the width is defined by a separation between the plurality of blade segments along the perimeter of the blade, wherein each of the plurality of blade segments is independently attached to the second blade portion;

wherein the interior-most portion of the blade scoop is located nearest the center arbore bore of the blade.

9. The blade of claim 8, wherein the depth of each of the plurality of blade scoops is defined by a combination of the first depth and the second depth, and wherein:

the second depth of the plurality of blade scoops is measured from the perimeter of the blade to a distal end of a blade segment depth of one blade segment of the plurality of blade segments; and the first depth of the plurality of blade scoops is measured from the distal end of the blade segment depth to a terminal end of the blade scoop, wherein the plurality of blade scoops are cut into the outer perimeter of the first blade portion.

10. The blade of claim 9, wherein the portion of the first depth of the plurality of blade scoops that is cut into the outer perimeter of the first blade portion comprises from about 30% to about 50% the total depth of each the plurality of blade scoops.

11. The blade of claim 9, wherein the portion of the second depth of the plurality of blade scoops that is defined by the separation between the plurality of blade segments of the second blade portion comprises from about 50% to about 70% the total depth of each of the plurality of blade scoops.

12. The blade of claim 8, wherein the plurality of blade scoops comprise varying depths such that two or more of the plurality of blade scoops comprise a different depth.

13. The blade of claim 8, further comprising a blade diameter, and wherein the depth of at least a portion of the plurality of blade scoops comprises from about 10% to about 20% the blade diameter.

14. The blade of claim 8, further comprising a blade diameter, and wherein the depth of at least a portion of the plurality of blade scoops comprises from about 15% to about 25% the blade diameter.

15. The blade of claim 8, wherein the depth of at least a portion of the plurality of blade scoops is greater than or equal to 1.5 inches.

16. The blade of claim 1, wherein the plurality of blade scoops are configured for collecting and excavating one or more of dirt, mud, rocks, concrete, or asphalt during a microtrenching operation.

17. The blade of claim 1, wherein at least a portion of the plurality of blade scoops are cut into an outer perimeter of the first blade portion at an angle that is offset from a radial line, wherein the radial line extends from the center arbore bore to the perimeter of the blade.

18. The blade of claim 17, wherein the angle that is offset from the radial line increases a quantity of substrate that is collected and excavated by the plurality of scoops during a microtrenching operation.

19. The blade of claim 1, wherein the plurality of blade segments define a cutting edge of the blade, and wherein the blade further comprises one or more cutters attached to the plurality of blade segments.

20. The blade of claim 1, wherein each of the plurality of blade scoops is an indentation cut into the perimeter of the blade such that the plurality of blade scoops are defined by an absence of material.

* * * * *